(12) United States Patent
Takahashi et al.

(10) Patent No.: US 12,481,154 B2
(45) Date of Patent: Nov. 25, 2025

(54) DISPLAY CONTROL APPARATUS, DISPLAY CONTROL METHOD, AND DISPLAY CONTROL PROGRAM

(71) Applicant: SONY CORPORATION, Tokyo (JP)

(72) Inventors: Naomasa Takahashi, Chiba (JP); Ken Ootsuka, Chiba (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 17/291,359

(22) PCT Filed: Nov. 20, 2019

(86) PCT No.: PCT/JP2019/045365
§ 371 (c)(1),
(2) Date: May 5, 2021

(87) PCT Pub. No.: WO2020/110848
PCT Pub. Date: Jun. 4, 2020

(65) Prior Publication Data
US 2022/0004002 A1    Jan. 6, 2022

(30) Foreign Application Priority Data
Nov. 27, 2018    (JP) .................................. 2018-221720

(51) Int. Cl.
*G02B 27/01* (2006.01)
*G03B 21/14* (2006.01)
*G09G 3/00* (2006.01)

(52) U.S. Cl.
CPC ......... *G02B 27/0172* (2013.01); *G03B 21/14* (2013.01); *G09G 3/001* (2013.01); *G09G 2320/0626* (2013.01)

(58) Field of Classification Search
CPC ..... G09G 3/001; G03B 21/14; G02B 27/0172
See application file for complete search history.

(56) References Cited

U.S. PATENT DOCUMENTS

| | | | |
|---|---|---|---|
| 9,791,694 B1 | 10/2017 | Haverkamp | |
| 2008/0111833 A1* | 5/2008 | Thorn | G06F 1/3231 345/690 |
| 2015/0234459 A1* | 8/2015 | George-Svahn | G06V 20/597 345/156 |
| 2015/0245017 A1* | 8/2015 | Di Censo | H04N 13/366 348/51 |

(Continued)

FOREIGN PATENT DOCUMENTS

| | | | | |
|---|---|---|---|---|
| CN | 104614913 A | | 5/2015 | |
| CN | 109236132 A | * | 1/2019 | ............... E06B 5/00 |

(Continued)

OTHER PUBLICATIONS

Javornik, A., Rogers, Y., Gander, D., & Moutinho, A. (May 2017). MagicFace: Stepping into character through an augmented reality mirror. In Proceedings of the 2017 CHI Conference on Human Factors in Computing Systems (pp. 4838-4849).*

*Primary Examiner* — Sarah Lhymn
(74) *Attorney, Agent, or Firm* — Paratus Law Group, PLLC

(57) ABSTRACT

There is provided an apparatus including circuitry configured to control a transmissivity of a transparent screen and a brightness of an image projected on the transparent screen, based on a motion of a user.

17 Claims, 9 Drawing Sheets

(56) References Cited

U.S. PATENT DOCUMENTS

| | | | |
|---|---|---|---|
| 2016/0035138 A1 | 2/2016 | Kim et al. | |
| 2016/0292917 A1 | 10/2016 | Dorner | |
| 2018/0003966 A1* | 1/2018 | Kilcher | G02F 1/15 |
| 2018/0259776 A1* | 9/2018 | Alton | G02B 27/0172 |
| 2018/0265002 A1* | 9/2018 | Kawamoto | G09G 5/00 |
| 2019/0222830 A1* | 7/2019 | Edwin | G02B 27/0176 |
| 2020/0082790 A1* | 3/2020 | Moore | G09G 5/10 |

FOREIGN PATENT DOCUMENTS

| | | |
|---|---|---|
| JP | 2006248384 A | 9/2006 |
| JP | 2006276292 A | 10/2006 |
| JP | 2010013054 A | 1/2010 |
| JP | 2010072365 A | 4/2010 |
| JP | 2011-213186 A | 10/2011 |
| JP | 2016061916 A | 4/2016 |
| JP | 2020087049 A | 6/2020 |
| WO | WO 2012/049617 A1 | 4/2012 |

* cited by examiner

| Setting ID | Sight line detection | Light control film | Image signal adjustment | ... |
|---|---|---|---|---|
| ... | ... | ... | ... | ... |
| A11 | Right side mirror | Shield only right side mirror from light | Right side mirror portion image ON | ... |
| | Left side mirror | Shield only left side mirror from light | Left side mirror portion image ON | ... |
| | Rearview mirror | Shield only rearview mirror from light | Rearview mirror portion image ON | ... |
| | ... | ... | ... | ... |
| ... | ... | ... | ... | ... |
| ... | ... | ... | ... | ... |

DB12

| Setting ID | Sight line detection | Light control mirror | ... |
|---|---|---|---|
| ... | ... | ... | ... |
| A12 | Right side mirror | Only right side mirror is mirror | ... |
| | Left side mirror | Only left side mirror is mirror | ... |
| | Rearview mirror | Only rearview mirror is mirror | ... |
| | ... | ... | ... |
| ... | ... | ... | ... |
| ... | ... | ... | ... |

| Setting ID | Environmental illuminance value | Light control film | Light control mirror | ... |
|---|---|---|---|---|
| ... | ... | ... | ... | ... |
| A13 | High | Light shielding | Mirror | ... |
| | Medium | Semi-transmission | Half mirror | ... |
| | Low | Transmission | OFF (camera state) | ... |
| | ... | ... | ... | ... |
| ... | ... | ... | ... | ... |
| ... | ... | ... | ... | ... |

FIG.10

DISPLAY CONTROL APPARATUS, DISPLAY CONTROL METHOD, AND DISPLAY CONTROL PROGRAM

CROSS REFERENCE TO RELATED APPLICATIONS

This application is a National Stage Patent Application of PCT International Patent Application No. PCT/JP2019/045365 filed Nov. 20, 2019 under 35 U.S.C. § 371, which claims the benefit of Japanese Priority Patent Application JP 2018-221720 filed Nov. 27, 2018, the entire contents of which are incorporated herein by reference.

TECHNICAL FIELD

The present disclosure relates to a display control apparatus, a display control method, and a display control program. Specifically, the present disclosure relates to control of image display using a projector.

BACKGROUND ART

Computerization of a rearview mirror, a side mirror, etc. installed in an automobile is in progress. For example, by installing a display at a position of a conventional mirror and displaying an image captured by the camera on the display, it is possible to provide a user with an image having a wider angle of view or a clearer image than that of the conventional mirror.

For example, as a technology related to image display of an automobile, there is known a technology of allowing only a driver to visually recognize a necessary image by projecting an image in the vicinity of a front window using a holographic method.

CITATION LIST

Patent Literature

PTL 1: Japanese Patent Application Laid-open No, 2011-213186

SUMMARY

Technical Problem

According to the conventional technology, it is possible to allow only the driver to visually recognize information without displaying unnecessary information for a fellow passenger other than the driver.

However, in the conventional technology, it may be difficult to ensure a wide field of view of the user while ensuring visibility of the image. For example, when an image projected from a projector is merely displayed, it is difficult for the user to clearly visually recognize the image in the automobile susceptible to external light, especially in the daytime, etc. In addition, even when a display is used in combination with the projector, since the display is installed at a physical mirror installation position, there is concern that a housing of the display may block a field of view of the driver. Note that the above-mentioned problem is not limited to a vehicle such as the automobile, and is similarly applied in an environment frequently exposed to external light.

Therefore, the present disclosure proposes a display control apparatus, a display control method, and a display control program capable of ensuring a wide field of view of the user while ensuring visibility of an image.

Solution to Problem

According to an aspect of the present disclosure, there is provided an apparatus including circuitry configured to control a transmissivity of a transparent screen and a brightness of an image projected on the transparent screen, based on a motion of a user.

According to another aspect of the present disclosure, there is provided a method including controlling a transmissivity of a transparent screen and a brightness of an image projected on the transparent screen, based on a motion of a user.

According to another aspect of the present disclosure, there is provided a nontransitory computer-readable medium having embodied thereon a program, which when executed by a computer causes the computer to execute a method, the method including controlling a transmissivity of a transparent screen and a brightness of an image projected on the transparent screen, based on a motion of a user.

BRIEF DESCRIPTION OF DRAWINGS

FIG. 9 is a diagram (1) illustrating an example of a data table according to the second embodiment of the present disclosure.

FIG. 10 is a diagram (2) illustrating an example of a data table according to the second embodiment of the present disclosure.

DESCRIPTION OF EMBODIMENTS

Figure 1:
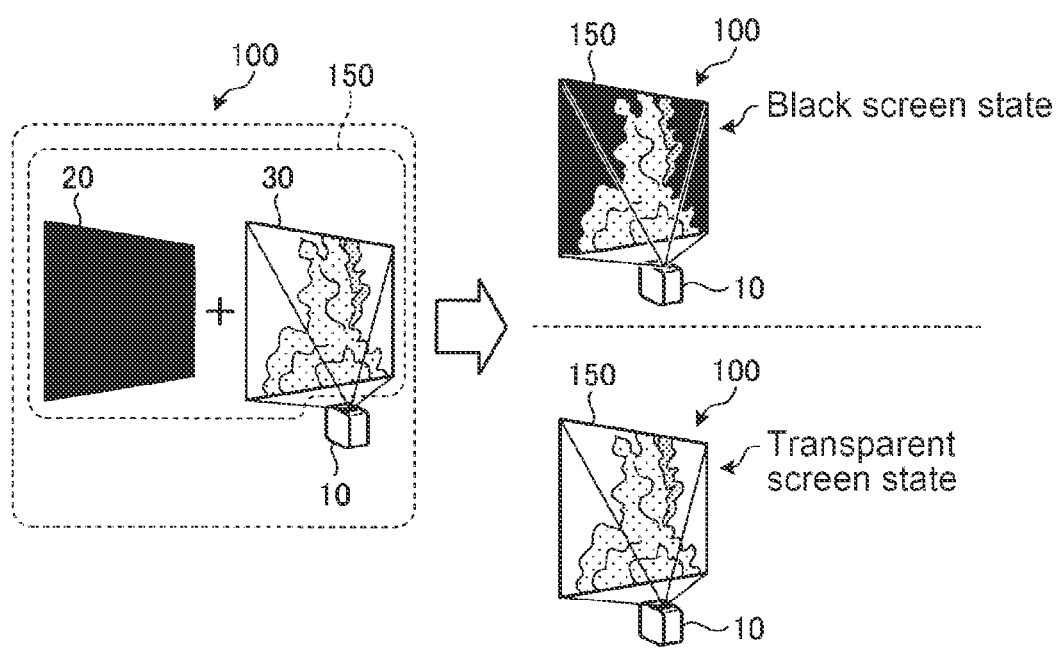
FIG. 1 is a diagram illustrating an example of display control processing according to a first embodiment of the present disclosure.

Hereinafter, embodiments of the present disclosure will be described in detail on the basis of drawings. Note that in each of the following embodiments, the same part will be denoted by the same reference numeral, thereby omitting redundant description.

The present disclosure will be described in the order of items shown below.

1. First Embodiment
1-1 One example of display control processing according to first embodiment
1-2 Configuration example of display control apparatus according to first embodiment
1-3 Procedure of display control processing according to first embodiment
1-4 Modification according to first embodiment
2. Second embodiment
2-1 One example of display control processing according to second embodiment
2-2 Configuration example of display control apparatus according to second embodiment
2-3 Modification according to second embodiment
3. Other embodiments
3-1 One example of display control system according to present disclosure
3-2 Other
4. Effect of display control apparatus according to present disclosure
5. Hardware configuration 1. First Embodiment

[1-1. One Example of Display Control Processing According to First Embodiment]

In the present disclosure, a description will be given of a display control apparatus 100 capable of ensuring a wide field of view of a user while ensuring visibility of an image.

In general, for example, a display employing a system such as a liquid crystal display (LCD) and an organic light emitting diode (OLED) is used as an apparatus for displaying an image. However, the display of the LCD or OLED system has a housing enlarged in proportion to a size of a screen, and thus may block a field of view of the user. For example, there is an example in which a display is installed in place of a conventional rearview mirror or side mirror installed in an automobile. However, in this case, there is concern that a housing of the display may narrow a field of view of a driver.

A transparent display is mentioned as a proposal for enabling image display without blocking the field of view of the user. The transparent display can be realized by a known system such as the LCD and the OLED. However, in the LCD or OLED system, structurally, it is impossible to avoid light being blocked by a semiconductor circuit around a light emitting section, and it is difficult to increase transparency (transmittance). In addition, since the display of the LCD or OLED system has fixed pixels, there is a problem that a size and resolution of a screen are fixed. Furthermore, the transparent display of the LCD or OLED system has a problem that a production facility becomes complicated.

In view of the above point, there is a proposal to display an image by combining a projector and a screen instead of the transparent display. For example, it is possible to exhibit an equivalent function to that of a display medium such as the display of the LCD or OLED system using a simple configuration in which an ultra-short focus projector is installed directly under the screen. In addition, the projector has an advantage of being able to flexibly set a size and resolution of an image to be projected. However, even when such a configuration is adopted, since a configuration of the screen, etc. for projection is necessary, a sense of presence of a display medium such as the screen is given in a state in which the user does not view the image.

Incidentally, there is a transparent screen as an example of a screen on which the projector performs projection. For example, the transparent screen is configured to enclose a substance that diffuses light with a substance having a high transmittance. The transparent screen is normally transparent. However, the transparent screen is capable of displaying, when an image, etc. is projected, the projected image thereon by reflecting light at a specific angle. In accordance with the transparent screen, since it is difficult to cause the user to feel a sense of presence when the image is not projected, it is possible to avoid the field of view of the user being blocked by screen installation.

However, the transparent screen having high transmittance is susceptible to ambient light such as external light. For this reason, in the above configuration, even if it is possible to display an image in a dark room, etc., there is concern that visibility of the image may extremely deteriorate, for example, under external light such as in a vehicle. Meanwhile, when black coating, etc. is performed on a screen surface in an attempt to prevent an influence of ambient light, the transmittance of the screen decreases.

As described above, in image display, various problems are present to allow the wide field of view of the user to be ensured while ensuring visibility of the image. The display control apparatus 100 according to an embodiment of the present disclosure solves the above-mentioned problems by a configuration and display control processing described below. Hereinafter, an example of display control processing performed by the display control apparatus 100 according to the first embodiment will be described using FIG. 1 to FIG. 3.

FIG. 1 is a diagram illustrating an example of display control processing according to the first embodiment of the present disclosure. Display control processing according to the first embodiment of the present disclosure is performed by the display control apparatus 100 illustrated in FIG. 1.

In the first embodiment, the display control apparatus 100 includes, as components, a projector 10 having a function of projecting an image, and a display section 150 that displays the image projected from the projector 10. The display control apparatus 100 is an information processing apparatus that controls projection of an image of the projector 10 and a display mode of the display section 150.

Although not illustrated in FIG. 1, in the first embodiment, for example, the display control apparatus 100 is realized as a mode such as a microchip incorporated in the projector 10 or the display section 150. Alternatively, the display control apparatus 100 may correspond to a control apparatus that controls the microchip, etc. incorporated in the projector 10 or the display section 150. Note that in an example shown in FIG. 2 and thereafter, the display control apparatus 100 is a control apparatus that executes electronic control related to the automobile, and is an apparatus that controls the projector 10 and the display section 150 installed in the automobile.

In addition, even though the display section 150 and the projector 10 are described as individual devices in an example of FIG. 1 to facilitate understanding of description, the display control apparatus 100 may be configured as one housing in which the display section 150 and the projector 10 are integrated.

In addition, the display control apparatus 100 may have any mode as long as the display control apparatus 100 can control the projector 10 and the display section 150 by wire or wirelessly. For example, the display control apparatus 100 may correspond to a smartphone, a tablet terminal, etc. In this case, display control processing according to an embodiment of the present disclosure may be realized as one function of an application installed in a smartphone, a tablet terminal, etc.

The projector 10 is a device that projects image data, etc. In the first embodiment, the projector 10 is referred to as a so-called ultra-short focus projector, and can project an image on a medium several centimeters to several tens of centimeters ahead.

Note that in the example of FIG. 1, the projector 10 and the display section 150 are spatially separated from each other. However, the projector 10 may be integrated with the display section 150. For example, the projector 10 may be embedded in a lower or upper bezel portion (edge) of the display section 150.

The display section 150 includes a light control film 20 and a transparent screen 30. For example, the display section 150 is configured by bonding the light control film 20 and the transparent screen 30.

The light control film 20 is a film whose transmittance is variable by voltage or current control. For example, the light control film 20 is a film configured by interposing an electrochromic element between transparent electrodes, and has a light control function of an electrochromic system. In the electrochromic system, the transmittance of the film is controlled by occurrence of an oxidation reaction or a reduction reaction in the electrochromic element in accordance with a voltage applied to the transparent electrode. Note that a suspended particle device (SPD) method, a gas chromic method, etc. may be employed for the light control film 20.

That is, the light control film 20 can freely change the transmittance by electronic control. For example, in the first embodiment, the light control film 20 is transparent (a shading rate is the lowest) when the transmittance is maximized, and black (the shading rate is the maximum) when the transmittance is minimized.

The transparent screen 30 is a screen formed of a transparent material and a material that diffuses light. For example, in a case where the transparent screen 30 receives light projected from the projector 10 installed at a lower side or an upper side, a transparent material portion transmits the light, and a material portion that diffuses light diffuses (reflects) light. Specifically, in a case of receiving light projected from the projector 10, the transparent screen 30 reflects light on a viewing surface, i.e., a front face of the transparent screen 30. In this way, the transparent screen 30 can display the image projected from the projector 10 while maintaining permeability.

As described above, the display control apparatus 100 can perform image display without blocking the field of view of the user using the display section 150 including a transparent member as a display surface of the image. In addition, the display control apparatus 100 can improve visibility of the image by controlling the transmittance of the light control film 20 and setting of an image signal projected by the projector 10.

For example, the display control apparatus 100 detects ambient light around the display section 150 using an illuminance sensor embedded in the display section 150. Specifically, the display control apparatus 100 detects a numerical value of an illuminance around the display section 150 (hereinafter collectively referred to as [environment information]).

Further, in a case where an extremely strong illuminance of external light, etc. is observed in the vicinity of the display section 150, the display control apparatus 100 performs a control operation such that the light control film 20 is in a light shielding state. In the example of FIG. 1, when the light control film 20 is in the light shielding state, the light control film 20 is black, and thus the display section 150 is in a black screen state. If the display section 150 is in the black screen state, the image projected from the projector 10 is clearly displayed when compared to a state in which the transmittance is high. That is, the display control apparatus 100 can improve visibility of the image.

Meanwhile, in a case where an extremely strong illuminance of external light, etc. is not observed in the vicinity of the display section 150, the display control apparatus 100 performs a control operation such that the light control film 20 is in a transmissive state. In the example of FIG. 1, when the light control film 20 is in the transmissive state, the light control film 20 is transparent, and thus the display section 150 is in a transparent screen state. If the display section 150 is in the transparent screen state, the image projected from the projector 10 is displayed on a transparent member. For this reason, the display control apparatus 100 can provide the user with a fresh image experience in which an image is displayed in space. In addition, in the transparent screen state, a sense of presence of the display section 150 can be relatively prevented from being felt by the user when compared to the black screen state.

In addition, the display control apparatus 100 may control the transmittance of the light control film 20 on the basis of not only the environment information but also information regarding motion of the user. For example, when the user is not gazing at the display section 150, the display control apparatus 100 maintains a transparent state. On the other hand, the display control apparatus 100 can cause transition of the display section 150 to the black screen state and clearly display an image by shielding the light control film 20 from the light at the timing when the user gazes at the display section 150.

Figure 2:
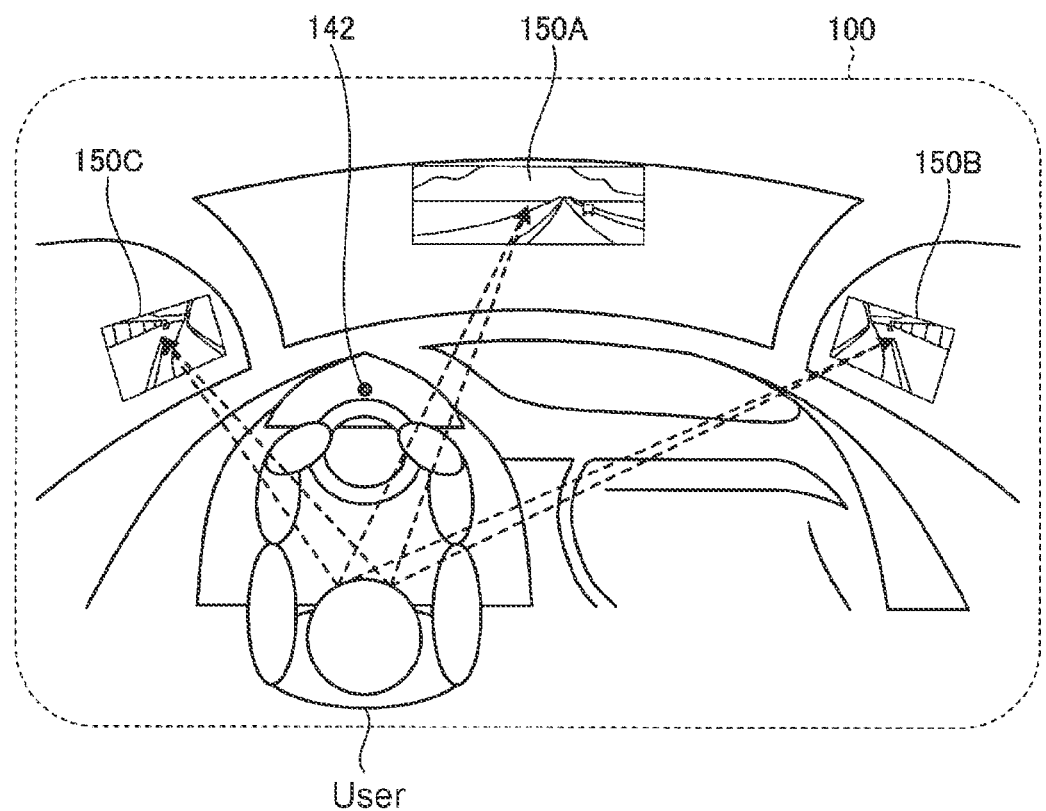
FIG. 2 is a diagram (1) for description of an example of display control processing according to the first embodiment of the present disclosure.

Next, a description will be given of an example of display control processing executed by the display control apparatus 100 using FIG. 2. FIG. 2 is a diagram for description of an example of display control processing according to the first embodiment of the present disclosure.

In the example illustrated in FIG. 2, the display control apparatus 100 is an apparatus that electronically controls various devices installed in the automobile. For example, it is presumed that the display control apparatus 100 is incorporated in the automobile. In the example illustrated in FIG. 2, the display control apparatus 100 controls each of a plurality of display sections 150A, 150B, and 150C. Note that hereinafter, when it is unnecessary to distinguish each of the plurality of display sections 150A, 150B, and 150C, the display sections will be collectively referred to as a [display section 150].

As illustrated in FIG. 2, the display section 150A is installed at an upper portion on a front face of a front window of the automobile. For example, the display section 150A is installed at a similar position to that of a rearview mirror of a conventional automobile. In addition, a camera for capturing a space in a direction directly facing the display section 150A may be embedded at an edge of the display section 150A. For example, the display section 150A displays an image captured by the camera installed therein. Specifically, the display section 150A displays an image similar to an image projected by the rearview mirror of the conventional automobile.

In addition, as illustrated in FIG. 2, the display section 150B is installed in a part of a right side window of the automobile. For example, the display section 150B is installed at a position on the right side window to which the driver turns eyes when the driver checks a right side mirror of the conventional automobile. In addition, a camera for capturing a space in a direction directly facing the display section 150B may be embedded at an edge of the display section 150B. For example, the display section 150B displays an image captured by the camera installed therein. Specifically, the display section 150B displays an image similar to an image projected by the right side mirror of the conventional automobile.

In addition, as illustrated in FIG. 2, the display section 150C is installed in a part of a left side window of the automobile. For example, the display section 150C is installed at a position on the left side window to which the driver turns eyes when the driver checks a left side mirror of the conventional automobile. In addition, a camera for capturing a space in a direction directly facing the display section 150C may be embedded at an edge of the display section 150C. For example, the display section 150C displays an image captured by the camera installed therein. Specifically, the display section 150C displays an image similar to an image projected by the left side mirror of the conventional automobile.

In addition, although not illustrated in FIG. 2, for example, the projector 10 according to the display control apparatus 100 is installed at an upper portion or a lower portion of each of the display section 150A, the display section 150B, and the display section 150C. For example, the projector 10 may be installed by being embedded in a front panel of the automobile in which a speed meter, etc. is installed so that an image can be projected on each display section 150.

The display section 150 according to the display control apparatus 100 is transparent in a state in which an image is not displayed, and thus does not block the field of view from the inside to the outside of the automobile. That is, the user can handle the display section 150 in the same mode as a normal window.

In the example of FIG. 2, the display control apparatus 100 includes a depth sensor 142 that detects information regarding motion of the user visually recognizing the display section 150.

The depth sensor 142 is a device that detects a distance to a target object to estimate a shape of the target object or detect motion of the target object on the basis of the distance. The depth sensor 142 may correspond to any one of a Time of Flight (ToF) method, a stereo camera method, a Structured-Light (SL) method, an infrared method, etc. For example, the depth sensor 142 detects information such as a distance to the user viewing an image and motion of the user. Although not illustrated in FIG. 2, the display control apparatus 100 may separately include a sensor (a non-visible light camera, etc.) for tracking a sight line of the user (so-called eye tracking). In this way, the display control apparatus 100 can continuously acquire the motion of the user and the sight line of the user.

For example, the display control apparatus 100 acquires information indicating that the user is located at a driver seat as an example of the information regarding the motion of the user. In this case, the display control apparatus 100 may display an image on each of the display section 150A, the display section 150B, and the display section 150C. For example, the display control apparatus 100 performs a control operation to display an image captured by each camera on each of the display section 150A, the display section 150B, and the display section 150C so that each of display sections exhibits the same function as that of a conventional mirror.

In addition, the display control apparatus 100 acquires information indicating that the user is located at another seat without being located at the driver seat. In this case, the display control apparatus 100 may determine that the automobile is not in operation and the user is in a standby state in a front passenger seat, etc., and display an image other than a mirror (for example, image content related to entertainment, etc.) on each of the display section 150A, the display section 150B, and the display section 150C.

In addition, in a case of displaying an image on each of the display section 150A, the display section 150B, and the display section 150C, the display control apparatus 100 may control the transmittance of the light control film 20 in accordance with environment information. For example, the display control apparatus 100 controls the light control film 20 to obtain transmittance at which the user easily visually recognizes an image in accordance with an illuminance of external light. In addition, the display control apparatus 100 may control pixel information of an image projected by the projector 10 in accordance with the environment information. For example, the display control apparatus 100 adjusts a luminance value or contrast of the image in accordance with intensity (illuminance) of external light. Specifically, the display control apparatus 100 may perform a control operation such that the luminance value or the contrast of the image increases as the illuminance is higher. More specifically, the display control apparatus 100 may call preset settings for image quality and switch to an image mode referred to as so-called [vivid (high luminance, high contract, and high color temperature)], etc. As described above, the display control apparatus 100 may appropriately adjust setting (gamma, sharpness, color density, etc.) of pixel information in accordance with the environment information.

In addition, the display control apparatus 100 may control pixel information of the image projected by the projector 10 in accordance with information regarding the sight line of the user. Specifically, the display control apparatus 100 may determine whether to display an image on each of the display section 150A, the display section 150B, and the display section 150C in accordance with the information regarding the sight line of the user.

For example, the display control apparatus 100 detects that the user is gazing at the display section 150A or the display section 150B using the depth sensor 142, etc. or a sensor for eye tracking. Similarly, the display control apparatus 100 detects that the user is not gazing at the display section 150C. In this case, the display control apparatus 100 displays an image on the display section 150A or the display section 150B. That is, the display control apparatus 100 puts the display section 150A or the display section 150B in a light shielding state and controls the projector 10 to project an image. Meanwhile, the display control apparatus 100 puts the display section 150C in a transmissive state and controls the projector 10 to stop projection of an image on the display section 150C.

In this way, the display control apparatus 100 can ensure a wide field of view of the user by putting the display section 150C in a transparent state while displaying an image having high visibility on the display section 150A or the display section 150C at which the user gazes. That is, according to the display control apparatus 100, by changing a position and timing at which an image is displayed or the transmittance of the light control film 20 in accordance with various conditions, for example, it is possible to ensure a field of vision during driving while improving visibility of the image in a daytime sunny condition.

Note that even though the above description shows an example in which the transmittance, etc. is controlled on the basis of information based on eye tracking of the user, the display control apparatus 100 may control the transmittance, etc. not using eye tracking but using head tracked information, etc.

As described above, the display control apparatus 100 according to the first embodiment acquires information regarding motion of the user visually recognizing an image projected on the display section 150 that includes the transparent screen 30 for reflecting the image projected from the projector 10 and the light control film 20 having a variable transmittance. In addition, the display control apparatus 100 controls pixel information of an image to be projected on the transparent screen 30 and the transmittance of the light control film 20 on the basis of the information regarding the motion of the user.

Specifically, the display control apparatus 100 adjusts the transmittance of the display section 150 in accordance with the fact that the user is located in the automobile or the sight line of the user, and determines whether to project an image, selects a type of an image to be projected, or switch setting of an image signal. In this way, the display control apparatus 100 can exhibit a function as a mirror in a case where the user desires, etc. while maintaining visibility as a window. In addition, by controlling the transmittance of the light control film 20, the display control apparatus 100 does not decrease visibility of an image under strong light such as external light and thus can improve safety of driving. Note that even when an image is not displayed, the display control apparatus 100 may change the display section 150 to a state less susceptible to an influence of external light (for example, a semi-transmissive state) by controlling the transmittance in accordance with an ambient illuminance.

Figure 3:
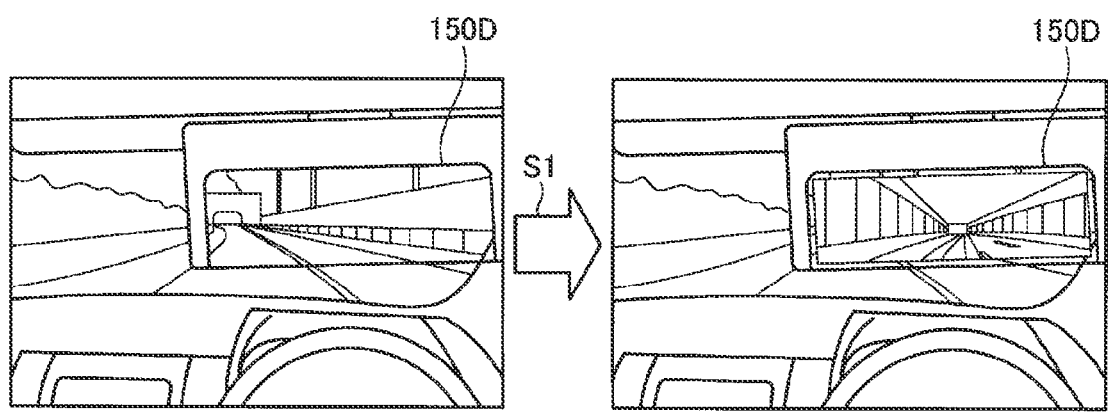
FIG. 3 is a diagram (2) for description of an example of display control processing according to the first embodiment of the present disclosure.

In addition, the display control apparatus 100 may superimpose the image projected on the display section 150 on a mirror video to display information regarding automatic driving such as a current speed and engine revolutions per minute (RPM). This point will be described using FIG. 3. FIG. 3 is a diagram (2) for description of an example of display control processing according to the first embodiment of the present disclosure.

FIG. 3 illustrates an example in which the display section 150D is installed in front of the driver separately from the front window. Specifically, in the example of FIG. 3, the display section 150D is installed at a position where a so-called sun visor is conventionally installed.

When the user does not desire to display an image, the display control apparatus 100 performs a control operation to put the display section 150D in the transmissive state or the semi-transmissive state, and sets display not to block the field of view.

Thereafter, the display control apparatus 100 receives a request for image display from the user. For example, the display control apparatus 100 receives, from the user in automatic driving, a request to display information regarding automatic driving (route currently traveling, speed, information on recognition of a surrounding object, etc.).

In this case, the display control apparatus 100 causes transition of the display section 150D to the light shielding state and projects an image on the display section 150D (step S1). In this case, as illustrated in FIG. 3, the display control apparatus 100 displays, on the display section 150D, information regarding automatic driving of a surrounding object, etc. recognized by the automobile.

As described above, the display control apparatus 100 may switch between the transmissive state and the light shielding state of the display section 150D, for example, in accordance with an operation of the user. In addition, in this case, the display control apparatus 100 can provide an image having high visibility by appropriately controlling the transmittance of the light control film 20 and the image signal.

In addition, the display control apparatus 100 projects an image by the projector 10, and thus can flexibly change a size of the image and a place where the image is projected. For example, even though FIG. 2 illustrates an example in which an image is projected on a part of the window, the display control apparatus 100 may display the image on the entire window. In addition, the display control apparatus 100 may perform processing for improving visibility of an image in accordance with a projection position, such as shielding only an area where an image is projected from light.

In addition, the display control apparatus 100 may identify a position presumed to be an obstacle to viewing an image, such as a direct spot of the sun and a position corresponding to strong reflection on the basis of the illuminance sensor, and project the image while avoiding the identified position. Alternatively, the display control apparatus 100 may identify a position of a high luminance point where strong light is observed, and perform a control operation to project an image on a place where the user does not need to visually recognize the position.

Hereinafter, a description will be given of a configuration of the display control apparatus 100, etc, according to the first embodiment using FIG. 4 and subsequent figures.

[1-2. Configuration Example of Display Control Apparatus According to First Embodiment]

The configuration of the display control apparatus 100 will be described using FIG. 4. FIG. 4 is a diagram illustrating a configuration example of the display control apparatus 100 according to an embodiment of the present disclosure. As illustrated in FIG. 4, the display control apparatus 100 includes a communication section 110, a storage section 120, a control section 130, a sensor 140, the display section 150, and an output section 160.

Figure 4:
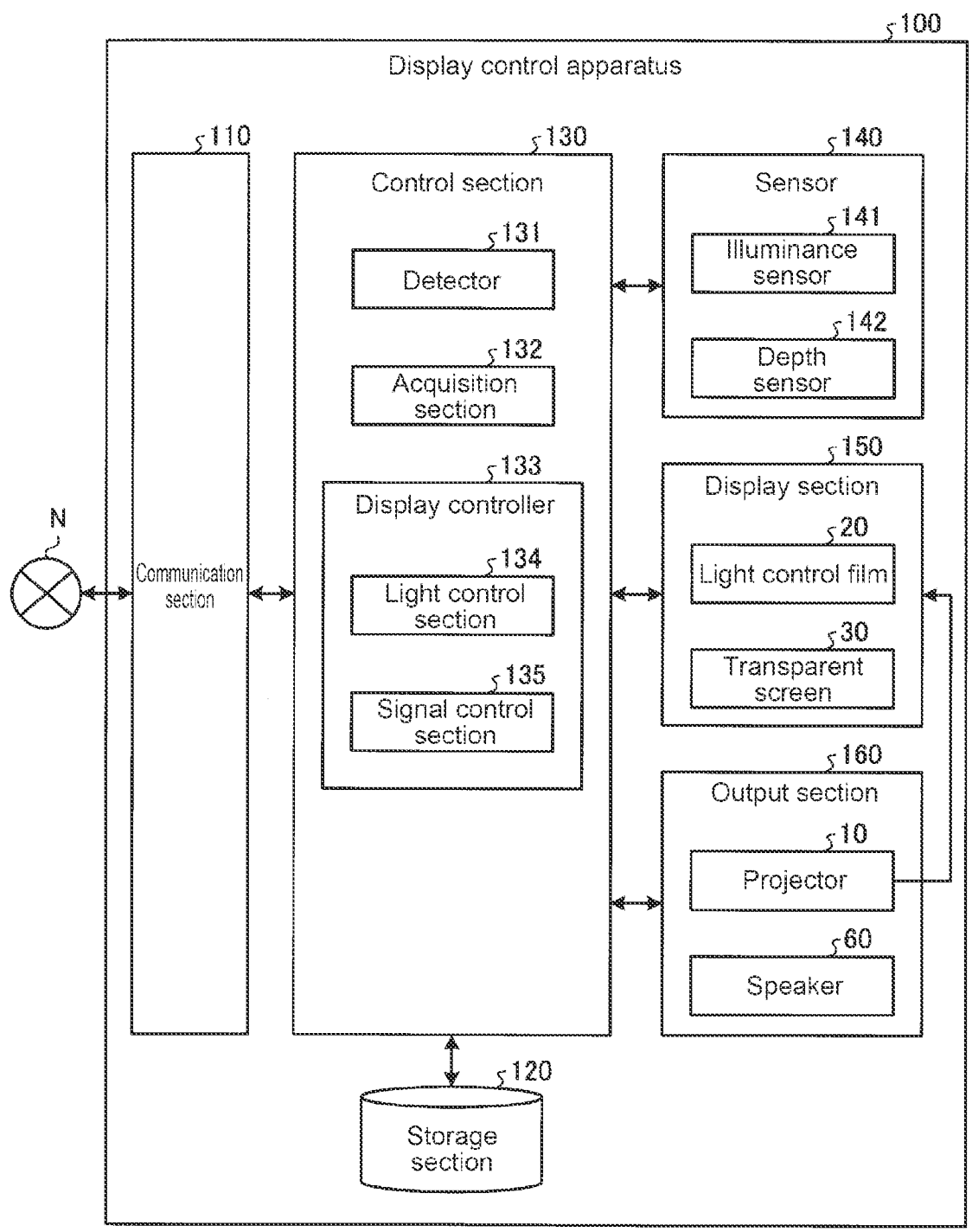
FIG. 4 is a diagram illustrating a configuration example of a display control apparatus according to the first embodiment of the present disclosure.

Note that the configuration illustrated in FIG. 4 is a functional configuration, and a hardware configuration may be different therefrom. In addition, functions of the display control apparatus 100 may be distributed and implemented in a plurality of physically separated devices. For example, the display control apparatus 100 may be separated into the display section 150 corresponding to a display medium, the projector 10, and a control device that controls the display section 150 and the projector 10.

The communication section 110 is realized by, for example, a network interface card (NIC). The communication section 110 may correspond to a universal serial bus (USB) interface including a USB host controller, a USB port, etc. Alternatively, the communication section 110 may correspond to a high-definition multimedia interface (HDMI) (registered trademark) interface, etc. for receiving an input of an image file projected by the projector 10. Alternatively, the communication section 110 may correspond to a wired interface or a wireless interface. For example, the communication section 110 may correspond to a wireless communication interface of a wireless local area network (LAN) method or a cellular communication method. The communication section 110 functions as communication means or transmission means of the display control apparatus 100. For example, the communication section 110 is connected to a network N (such as the Internet) by wire or wirelessly, and transmits and receives information to and from another information processing terminal, etc. via the network N. For example, the communication section 110 may receive an operation from the user or an input of various types of information via the network N.

The storage section 120 is realized by, for example, a semiconductor memory device such as a random access memory (RAM) and a flash memory, or a storage device such as a hard disk and an optical disc. The storage section 120 stores various data.

For example, the storage section 120 stores a data table DB11 in which information about a scheme of controlling the transmittance or the image in accordance with the motion of the user is set.

Figure 5:
FIG. 5 is a diagram illustrating an example of a data table according to the first embodiment of the present disclosure.

FIG. 5 illustrates an example of the data table DB11 according to the first embodiment. FIG. 5 is a diagram illustrating an example of the data table DB11 according to the first embodiment of the present disclosure. In the example illustrated in FIG. 5, the data table DB11 has items such as [setting ID], [sight line detection], [light control film], and [image signal adjustment].

[Setting ID] indicates identification information for identifying setting information. [Sight line detection] indicates information regarding sight line detection of the user in the information regarding the motion of the user. For example, [right side mirror] in sight line detection indicates that the user is gazing at a position corresponding to the right side mirror (the display section 150B in the example of FIG. 2).

[Light control film] indicates the transmissive state of the light control film 20. For example, [shield only right side mirror from light] in the light control film indicates that the light control film 20 related to the display section 150 at a position corresponding to the right side mirror is controlled to be in the light shielding state. Note that even though FIG. 5 shows an example in which relative information such as [light shielding] is stored in an item of light control film, a specific numerical value (transmittance) may be stored in an item of the light control film.

[Image signal adjustment] indicates setting information of an image signal projected from the projector 10. For example, [right side mirror portion image ON] in the image signal adjustment indicates that an image is projected on the display section 150 at a position corresponding to the right side mirror. Note that although illustration in FIG. 5 is omitted, setting of luminance information of an image to be projected, etc. may be stored in an item of the image signal adjustment. For example, preset image modes, etc. such as, [vivid], [standard], and [film] may be stored in an item of the image signal adjustment. For each of these image modes, for example, a specific numerical value (pixel information) such as different luminance, contrast, and color temperature is set.

That is, in the example illustrated in FIG. 5, as an example of setting information identified by a setting ID [A11], when sight line detection corresponds to [right side mirror], the light control film is controlled to [shield only right side mirror from light], and the image signal is adjusted to [right side mirror portion image ON].

Returning to FIG. 4, the description will be continued. For example, the control section 130 is realized when a program (for example, a display control program according to an embodiment of the present disclosure) stored the display control apparatus 100 is executed with a RAM or the like as a work area by a central processing section (CPU), a micro processing section (MPU), a graphics processing section (GPU), etc. In addition, the control section 130 is a controller, and may be realized by, for example, an integrated circuit such as an application specific integrated circuit (ASIC) and a field programmable gate array (FPGA).

As illustrated in FIG. 4, the control section 130 includes a detector 131, an acquisition section 132, and a display controller 133, and implements or executes a function or an action of information processing described below. Note that an internal configuration of the control section 130 is not limited to the configuration illustrated in FIG. 4, and may correspond to another configuration when the configuration performs information processing described below.

The detector 131 detects various types of information by controlling the sensor 140. For example, the detector 131 detects environment information indicating an environment around the display control apparatus 100 or the display section 150.

The sensor 140 is a device that detects various types of information regarding the display control apparatus 100. For example, the sensor 140 includes an illuminance sensor 141 and the depth sensor 142.

The illuminance sensor 141 is referred to as an ambient light sensor, etc., and is a device that detects an ambient illuminance using a phototransistor, a photodiode, etc.

The depth sensor 142 is a device that detects a distance to a target object to estimate a shape of the target object or detect motion of the target object on the basis of the distance. The depth sensor 142 may correspond to any one of a ToF method, a stereo camera method, a SL method, an infrared method, etc. For example, the depth sensor 142 detects information such as a distance to the user viewing an image and motion of the user.

Note that the sensor 140 illustrated in FIG. 4 is an example, and the display control apparatus 100 may include various sensors for detecting numerical values (for example, temperature, humidity, altitude, etc.) indicating the environment information. In addition, the sensor 140 may include a sensor for tracking a direction of the sight line of the user or movement of the sight line in the information regarding the motion of the user. In addition, it is possible to adopt a mode in which the sensor 140 is attached to a body of the user, etc. In this case, the display control apparatus 100 acquires sensing information (tracking information, etc.) transmitted from the sensor 140 via the network N.

The acquisition section 132 acquires various types of information. For example, the acquisition section 132 acquires various types of sensing information detected by the detector 131. Specifically, the acquisition section 132 acquires information relates to motion of the user visually recognizing the image projected on the display section 150 that includes the transparent screen 30 for reflecting the image projected from the projector 10 and the light control film 20 having a variable transmittance.

For example, the acquisition section 132 acquires information on the motion of the user around the display section 150, which is detected by the depth sensor 142. Note that the user around the display section 150 refers to, for example, a user capable of performing distance measurement, etc. using the depth sensor 142.

In addition, the acquisition section 132 acquires information regarding the sight line of the user as the information regarding the motion of the user. Specifically, the acquisition section 132 acquires eye tracking information of the user such as a place at which the user is gazing.

As the eye tracking information, for example, the acquisition section 132 acquires information indicating whether the user is gazing at the display section 150. Specifically, when a plurality of display sections 150 is present as in the example of FIG. 2, the acquisition section 132 may acquire information regarding a display section 150 at which the user gazes among the plurality of display sections 150.

In addition, the acquisition section 132 may acquire tracking information of a head of the user as the information regarding the motion of the user.

For example, the acquisition section 132 acquires a relative positional relationship between the user directly facing the display section 150 and the display section 150 as the tracking information of the head of the user. Specifically, when the user is located within an angle (for example, plus or minus 10 degrees, etc.) at which the user is determined to directly face the display section 150 in an angle of view at which the depth sensor 142 can detect an object, the acquisition section 132 determines that the user directly faces the display section 150. Alternatively, when the user is located within an angle determined to largely deviate from the angle of view at which the depth sensor 142 can detect an object (for example, near a restriction of the angle of view at which the depth sensor 142 can detect an object), the acquisition section 132 determines that the user does not directly face the display section 150 and is located at a position deviating therefrom. In addition, the acquisition section 132 determines that the user is located between a position at which the user directly faces the display section 150 and a position determined to largely deviate therefrom.

In this way, for example, the acquisition section 132 can determine whether the user is located in the automobile, is located at the driver seat, is located at the front passenger seat, etc. In addition, the display controller 133 described below can select a position at which an image is displayed using the display section 150 disposed at the position for a certain user on the basis of a positional relationship of the user.

In addition, the acquisition section 132 acquires the environment information acquired by the detector 131. Specifically, the acquisition section 132 acquires the environment information around the display section 150 that includes the transparent screen 30 for reflecting the image projected from the projector 10 and the light control film 20 having a variable transmittance.

For example, the acquisition section 132 acquires the illuminance around the display section 150 detected by the illuminance sensor 141 provided in the vicinity of the display section 150.

The acquisition section 132 appropriately stores the acquired information in the storage section 120. In addition, the acquisition section 132 may appropriately acquire information for processing from the storage section 120. In addition, the acquisition section 132 may acquire information from various external devices via the network N.

The display controller 133 controls the pixel information of the image to be projected on the transparent screen 30 and the transmittance of the light control film 20 on the basis of the information regarding the motion of the user.

For example, the display controller 133 controls the pixel information of the image to be projected on the transparent screen 30 and the transmittance of the light control film 20 on the basis of the information regarding the sight line of the user.

For example, as illustrated in FIG. 2, when a plurality of display sections 150 is present, the display controller 133 performs a control operation such that a display section 150 at which the user gazes and a display section 150 at which the user does not gaze have different pieces of pixel information and transmittances.

More specifically, the display controller 133 performs a control operation such that an image is projected on the display section 150 at which the user gazes and the light control film 20 is shielded from light, and performs a control operation such that an image is not projected on the display section 150 at which the user does not gaze and the light control film 20 is penetrated. In this way, since the display controller 133 displays an image when the user gazes, and maintains a transmissive state for a portion where the user is not gazing, the user can maintain a wide field of view.

In addition, the display controller 133 may control the pixel information of the image to be projected on the transparent screen 30 and the transmittance of the light control film 20 on the basis of the tracking information of the head of the user.

For example, the display controller 133 controls the pixel information of the image to be projected on the transparent screen 30 and the transmittance of the light control film 20 on the basis of a relative positional relationship between the user and the display section 150. Specifically, the display controller 133 may display the image only on a display section 150, a front face of which is directly faced by the user, and maintain a transmissive state of a display section 150 located on a side of the user.

In addition, the display controller 133 may control the pixel information of the image to be projected on the transparent screen 30 and the transmittance of the light control film 20 on the basis of the environment information. For example, the display controller 133 controls the pixel information and the transmittance on the basis of the illuminance around the display section 150 as an example of the environment information.

For example, the display controller 133 controls the pixel information of the image and the transmittance of the light control film on the basis of setting information in which the illuminance as an example of the environment information, the pixel information of the image, and the transmittance of the light control film are associated in advance. For example, the setting information is stored in the storage section 120 in advance.

As an example, the display controller 133 performs a control operation such that as the illuminance is higher, the transmittance of the light control film is lower, and a luminance value of the pixel of the image is higher. In this way, the display controller 133 can display a clear image even under a condition of a high illuminance such as external light.

As illustrated in FIG. 4, the display controller 133 includes a light control section 134 and a signal control section 135, and executes each of the above-described processes by controlling the light control section 134 and the signal control section 135.

The light control section 134 controls the transmittance of the light control film. For example, the light control section 134 controls the transmittance of the light control film in accordance with the motion of the user and the illuminance around the display section 150. Specifically, the light control section 134 controls a voltage or current value applied to the light control film 20 so that the transmittance of the light control film 20 at which the user gazes becomes a predetermined set value with reference to the data table DB11.

The signal control section 135 is a so-called video processor, and controls the pixel information of the image to be projected on the transparent screen 30. For example, the signal control section 135 controls the pixel information of the image to be projected on the transparent screen 30 in accordance with the motion of the user and the illuminance around the display section 150. Specifically, the signal control section 135 projects an image on the display section 150 at which the user gazes or pauses the image on the display section 150 at which the user is not gazing with reference to the data table DB11. In addition, the signal control section 135 controls an output value of an image signal to obtain pixel information according to the illuminance. For example, the signal control section 135 controls the output value of the image signal so that the luminance, the contrast, the color temperature, etc. in the image signal become set values according to the illuminance.

The display section 150 is a display medium for displaying the image projected from the projector 10. As illustrated in FIG. 4, the display section 150 includes the light control film 20 and the transparent screen 30.

The output section 160 is a device for outputting various types of information. As illustrated in FIG. 4, the output section 160 includes the projector 10 and a speaker 60. The projector 10 projects an image signal on the display section 150 on the basis of an image signal set by the display controller 133. The speaker 60 outputs an audio signal in an image file acquired by the acquisition section 132 and an image file stored in the storage section 120.

[1-3. Procedure of Display Control Processing According to First Embodiment]

Figure 6:
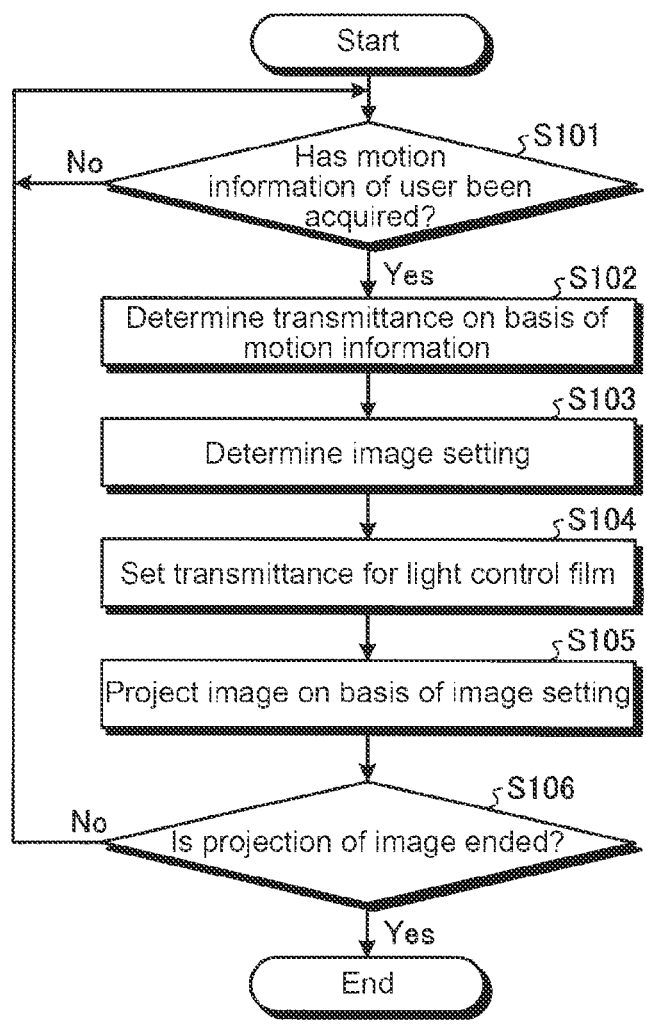
FIG. 6 is a flowchart illustrating a flow of processing according to the first embodiment of the present disclosure.

Next, a description will be given of a procedure of image processing according to the first embodiment using FIG. 6. FIG. 6 is a flowchart illustrating a flow of processing according to the first embodiment of the present disclosure.

As illustrated in FIG. 6, the display control apparatus 100 determines whether motion information of the user has been acquired (step S101). When the motion information has not been acquired (step S101; No), the display control apparatus 100 controls the sensor 140 and repeats a process for acquiring the motion information. For example, the display control apparatus 100 waits until the sensor 140 detects the user.

When the motion information has been acquired (step S101; Yes), the display control apparatus 100 determines the transmittance of the light control film 20 on the basis of the motion information (Step S102).

In addition, the display control apparatus 100 determines setting of the image signal output from the projector 10 on the basis of the motion information (step S103).

Subsequently, the display control apparatus 100 sets the transmittance determined in step S102 for the light control film 20 (step S104). Specifically, the display control apparatus 100 causes transition of the transmittance of the light control film 20 by controlling the light control film 20 on the basis of a parameter (a voltage value, etc.) for changing the light control film 20 to the transmittance determined in step S102.

In addition, the display control apparatus 100 projects the image on the display section 150 on the basis of image setting by controlling the projector 10 using image setting determined in step S103 (step S105). Note that when setting such as [image OFF] is determined in step S103, the display control apparatus 100 may temporarily suspend projecting the image on the display section 150.

Thereafter, the display control apparatus 100 determines whether an operation to end projection of the image has been received (step S106). Note that the operation to end projection of the image includes, for example, a situation in which the user turns OFF an engine of the automobile, etc. in addition to a situation in which an operation of ending projection of the image by the user is performed. When the operation to end projection of the image has not been received from the user (step S106; No), the display control apparatus 100 repeats a process of acquiring the motion information, and continues adjusting the transmittance and image setting to obtain appropriate image display in accordance with the motion information. Meanwhile, when the operation to end projection of the image has been received from the user (step S106; Yes), the display control apparatus 100 ends projection of the image.

[1-4. Modification According to First Embodiment]

The display control apparatus 100 according to the first embodiment may include a projector having a general focal length as well as the ultra-short focus projector as the projector 10. In addition, the display control apparatus 100 may receive light control and image setting operation from a terminal device such as a smartphone used by the user using, for example, a Wi-Fi (registered trademark) or a Bluetooth (registered trademark) function.

2. Second Embodiment

[2-1. One Example of Display Control Processing According to Second Embodiment]

A display control apparatus 200 according to a second embodiment includes a display section 250. The display section 250 further includes a light control mirror 40 in addition to the light control film 20 and the transparent screen 30. Hereinafter, a description will be given of display control processing performed by the display control apparatus 200 according to the second embodiment. Note that a description overlapping with the first embodiment will be omitted.

Figure 7:
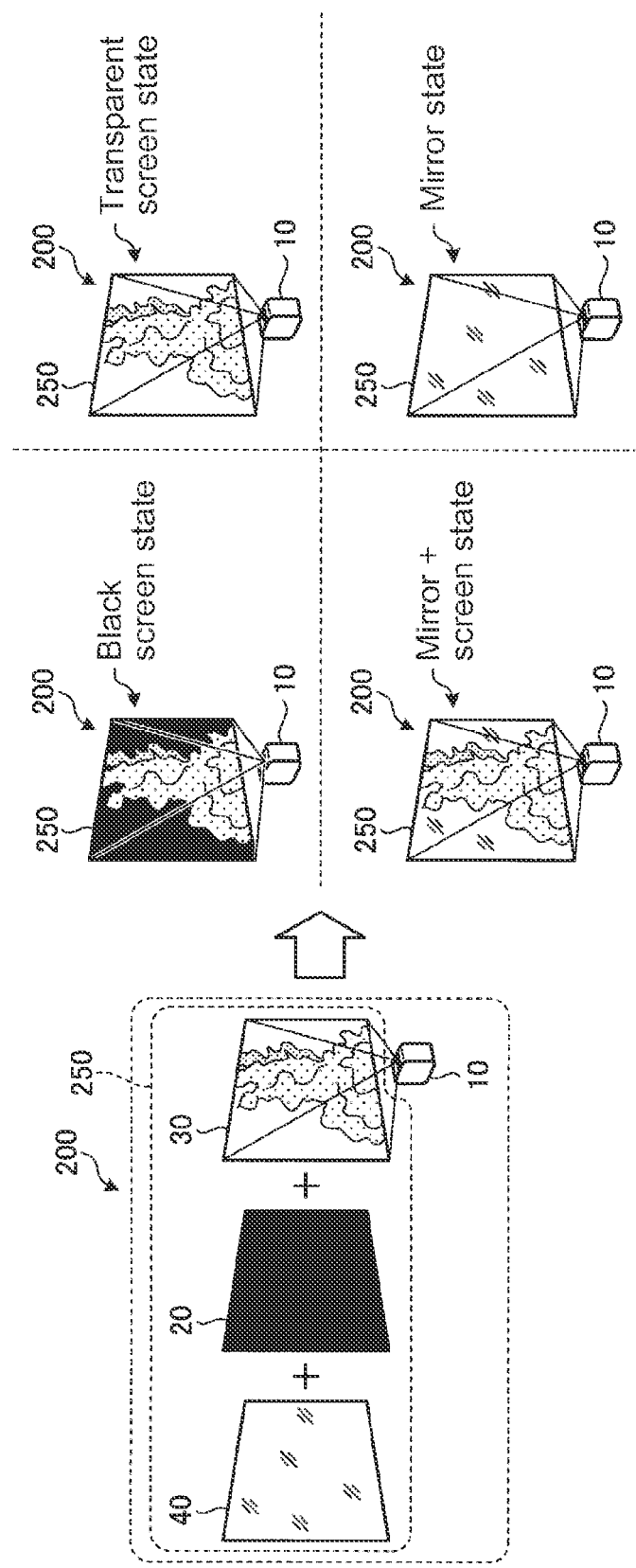
FIG. 7 is a diagram illustrating an example of display control processing according to a second embodiment of the present disclosure.

FIG. 7 is a diagram illustrating an example of display control processing according to the second embodiment of the present disclosure. Display control processing according to the second embodiment of the present disclosure is performed by the display control apparatus 200 illustrated in FIG. 7.

As illustrated in FIG. 7, the display section 250 according to the second embodiment includes the light control film 20, the transparent screen 30, and the light control mirror 40. For example, the display section 250 is configured by bonding the light control film 20, the transparent screen 30, and the light control mirror 40.

The light control mirror 40 is configured, for example, by interposing an electrochromic element between transparent electrodes. The light control mirror 40 can switch between a mirror state and a transparent state by electronic control.

The display control apparatus 200 according to the second embodiment can perform various types of image display by controlling the transmittance of the light control mirror 40 in addition to the light control film 20 and the transparent screen 30.

For example, the display control apparatus 200 can obtain a state in which operation as a screen is allowed while displaying a mirror in addition to the black screen state and the transparent screen state described in the first embodiment by controlling the transmittance of the display section 250. Such a state is indicated as a [mirror+screen state] in the example of FIG. 7. In the mirror+screen state, the display control apparatus 200 can further superimpose and display an image on the display section 250 in the mirror state.

In addition, the display control apparatus 200 can put the display section 250 in the mirror state by allowing the light control film 20 to be penetrated and controlling the light control mirror 40 in the mirror state. In this way, the display control apparatus 200 can provide the user with the display section 250 as a mirror when an image is not projected.

For example, when the display control apparatus 200 is installed in an automobile as in the first embodiment, the display section 250 illustrated in FIG. 7 may be installed at a corresponding position of a rearview mirror or a side mirror instead of a conventional rearview mirror or side mirror.

In this case, by controlling the light control mirror 40 to be transparent, the display control apparatus 200 can put the display section 250 in a transparent state while maintaining a shape of a mirror as in the past. For this reason, according to the display control apparatus 200, it is possible to ensure a wide field of view of the user at a front and a side. In addition, according to the display control apparatus 200, for example, when it is presumed that the visibility may not be ensured only by an original mirror, for example, at night, an image captured by a camera can be displayed to improve visibility with regard to the front and the side. For example, the display control apparatus 200 can prompt the user to comprehend a condition of a wider angle of view by projecting an image having a wider angle of view than that of the original mirror on the display section 250. In this way, the display control apparatus 200 can improve safety regarding driving.

In addition, the display section 250 related to the display control apparatus 200 can normally maintain a transparent state, and thus can be installed at various positions without being limited to a position of an original rearview mirror or side mirror. In this way, the display control apparatus 200 can perform a flexible operation such as allowing the user to arbitrarily select a place to be visually recognized when an image is confirmed.

Note that the display control apparatus 200 may be used not only for a mirror of the automobile but also for various applications. As an example, the display control apparatus 200 may be installed as a vanity mirror. The projector 10 related to the display control apparatus 200 is installed, for example in a lower portion of the vanity mirror. Note that, for example, the projector 10 may be installed on a floor surface, or may be embedded in an edge of the vanity mirror.

The display section 250 related to the display control apparatus 200 is in a mirror state when an image is not displayed. That is, the user can handle the display control apparatus 200 in the same mode as that of the vanity mirror.

Thereafter, in a case of receiving an image display operation from the user, the display control apparatus 200 starts a process of displaying an image. In this instance, for example, the display control apparatus 200 allows the light control mirror 40 to be transmissive to release the mirror state. In this way, the display section 250 functions as not a mirror but a screen for displaying an image. That is, the user can view and listen to an image using a mirror installed on a dressing table. Specifically, the user can cause the display control apparatus 200 to display image content corresponding to an example of makeup of the user. In this instance, as in the first embodiment, the display control apparatus 200 may adjust the transmittance of the light control film 20 and the image signal in accordance with the environment information to improve the visibility of the image.

In addition, the display control apparatus 200 may perform a process to switch between the mirror state and the transmissive state in accordance with an operation of the user or motion of the user.

For example, it is presumed that the user performs makeup of the user while displaying image content corresponding to a sample of makeup prepared in advance. In this case, when the user desires to display a face of the user on a mirror while displaying the image content, the user sets the light control mirror 40 in a semi-transmissive state. In the way, the user can check the face of the user on the mirror while displaying the image content.

In addition, the display control apparatus 200 may automatically change a display state of the screen without receiving an operation from the user. For example, the display control apparatus 200 acquires motion information of the user using the depth sensor 142 installed at the edge, etc. of the display section 250. Specifically, the display control apparatus 200 acquires motion of the user or position information such as whether the user is directly facing the display section 250 or obliquely viewing the display section 250. Alternatively, the display control apparatus 200 may observe movement, etc. of the head of the user on the basis of tracking information obtained by the depth sensor 142.

Further, for example, when the user is positioned directly in front of the display section 250, the display control apparatus 200 temporarily suspends projection from the projector 10 so that the user can use the mirror. In addition, for example, when the user obliquely looks into the display section 250, the display control apparatus 200 makes the display section 250 semi-transparent, starts projection from the projector 10, and displays an image.

In this way, the user can use the mirror when the user performs makeup and occasionally check the image content of the sample by performing an operation of slightly, moving the head sideways, etc. In addition, for example, when the user moves the head upward or downward with respect to the display section 250, the display control apparatus 200 may completely shield the light control film 20 from light and start projection from the projector 10. In this way, the display control apparatus 200 can display a clearer image in accordance with specific motion of the user. That is, the display control apparatus 200 can appropriately change setting of the display section 250 or the projector 10 in accordance with various types of motion of the user.

As described above, the display control apparatus 200 can display an image while maintaining permeability of the display section 250 in a manner that depends on the environment. In this way, the display control apparatus 200 can provide the user with a fresh image experience as if the outside scenery and the image are mixed.

As described above, the display control apparatus 200 controls pixel information of an image to be projected on the transparent screen 30 related to the display section 250, the transmittance of the light control film 20 related to the display section 250, and the transmittance of the light control mirror 40 on the basis of the environment information. In addition, the display control apparatus 200 may adjust the transmittance of the display section 250 in accordance with the motion of the user as well as the ambient illumination, etc. In this way, the display control apparatus 200 can perform highly convenient image display such as displaying an image by superimposing the image on a mirror while maintaining functionality as the mirror.

Figure 8:
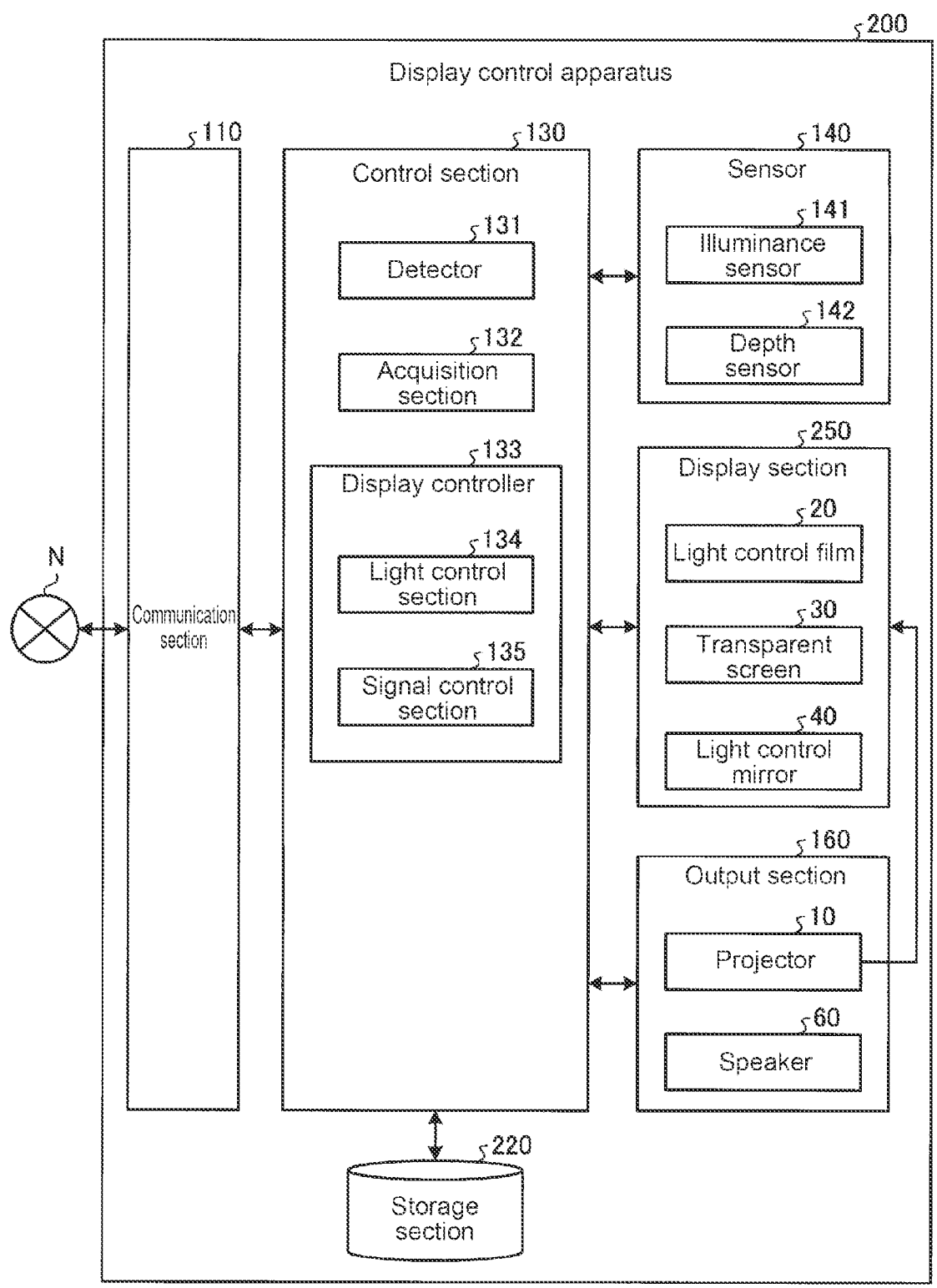
FIG. 8 is a diagram illustrating a configuration example of a display control apparatus according to the second embodiment of the present disclosure.

Hereinafter, a description will be given of a configuration of the display control apparatus 200, etc. according to the second embodiment using FIG. 8 and subsequent figures.

[2-2. Configuration Example of Display Control Apparatus According to Second Embodiment]

A description will be given of the configuration of the display control apparatus 200 using FIG. 8. FIG. 8 is a diagram illustrating a configuration example of the display control apparatus 200 according to an embodiment of the present disclosure. As illustrated in FIG. 8, the display control apparatus 200 is different from the first embodiment in that the display control apparatus 200 has the display section 250 including the light control mirror 40 and a storage section 220.

In addition to the information held by the storage section 120 according to the first embodiment, the storage section 220 stores a data table DB12 in which information about a scheme of controlling the light control mirror 40 in accordance with the sight line of the user is set and a data table DB13 in which information about a scheme of controlling the light control mirror 40 in accordance with the illuminance is set.

FIG. 9 illustrates an example of the data table DB12 according to the second embodiment. FIG. 9 is a diagram illustrating the example of the data table DB12 according to the second embodiment of the present disclosure. In the example illustrated in FIG. 9, the data table DB12 has items such as [setting ID], [sight line detection], and [light control mirror].

[Setting ID] and [sight line detection] correspond to the same items illustrated in FIG. 5. [Light control mirror] indicates setting information about a state in which the light control mirror is controlled to be. For example, [only right side mirror is mirror] in the light control mirror indicates that the right side mirror is controlled to be in the light shielding state (mirror state), and other mirror portions are controlled to be in a penetrated state.

That is, in the example illustrated in FIG. 9, as an example of setting information identified by a setting ID [A12], [right side mirror] in the sight line detection indicates that the light control mirror is controlled to be in a state of [only right side mirror is mirror].

Subsequently, the data table DB13 will be described. FIG. 10 illustrates an example of the data table DB13 according to the second embodiment. FIG. 10 is a diagram illustrating the example of the data table DB13 according to the second embodiment of the present disclosure. In the example illustrated in FIG. 10, the data table DB13 has items such as [setting ID], [environmental illuminance value], [light control film], and [light control mirror].

[Setting ID] corresponds to the same item illustrated in FIG. 5. [Environmental illuminance value] indicates an illuminance value in the environment information detected by the display control apparatus 100. Note that even though relative information such as [high], [medium], and [low] is stored in an item of the environmental illuminance value in the example of FIG. 10, a specific numerical value may be stored in the item of the environmental illuminance value. For example, an item [high] in the environmental illuminance value is a numerical value corresponding to daytime external light. In addition, an item [medium] in the environmental illuminance value is a numerical value corresponding to, for example, external light in the early morning or the evening. In addition, an item [low] in the environmental illuminance value is a numerical value corresponding to, for example, external light at night.

[Light control film] indicates a transmissive state of the light control film 20. Even though the example of FIG. 10 shows an example in which relative information such as [light shielding], [semi-transmission], and [transmission] is stored in an item of the light control film, a specific numerical value (transmittance) may be stored in the item of the light control film.

[Light control mirror] indicates setting information indicating transmittance of the light control mirror 40 to be set. For example, [mirror] in the light control mirror indicates that the mirror is controlled to be in a light shielding state. In addition, [half mirror] in the light control mirror indicates that the mirror is controlled to be in a semi-transmissive state. In addition, [OFF (camera state)] in the light control mirror indicates a state in which the mirror is put in the transmissive state not to exhibit a function as a physical mirror and the image projected from the projector 10 is projected thereon.

That is, in the example illustrated in FIG. 10, as an example of setting information identified by a setting ID [A13], when the environmental illuminance value corresponds to [high], the light control film is controlled to correspond to [light shielding], and the light control mirror is set to a [mirror] state.

Returning to FIG. 8, the description will be continued. The acquisition section 132 according to the second embodiment acquires environment information around the display section 250 further including the light control mirror 40 having a variable transmittance via the illuminance sensor 141, etc.

The display controller 133 according to the second embodiment controls at least one of the pixel information of the image to be projected on the transparent screen 30, the transmittance of the light control film 20, or the transmittance of the light control mirror 40 on the basis of the environment information. For example, as in the example illustrated in FIG. 7, the display controller 133 may simultaneously change all the transmittances of the light control film 20 and the light control mirror 40, and may fix the light control mirror 40 in the mirror state and change only the transmittance of the light control film 20.

In addition, the display controller 133 may control at least one of the pixel information of the image, the transmittance of the light control film, or the transmittance of the light control mirror 40 on the basis of setting information in which the environment information is associated with at least one of the pixel information of the image, the transmittance of the light control film 20, or the transmittance of the light control mirror 40 in advance. Specifically, the display controller 133 controls the pixel information, the transmittance, etc. on the basis of information set in advance with reference to the data table DB12 and the data table DB13.

[2-3. Modification According to Second Embodiment]

The display control apparatus 200 according to the second embodiment may include a normal mirror instead of the light control mirror 40. Even when such a configuration is adopted, the display control apparatus 200 can arbitrarily change the state of the display section 250 to a state other than the transparent screen state illustrated in FIG. 7.

3. Other Embodiments

The processes according to the respective embodiments described above may be implemented in various different forms other than the respective embodiments.

[3-1. One Example of Display Control System According to Present Disclosure]

For example, the display control apparatus according to an embodiment of the present disclosure may correspond to an apparatus separated from the projector 10 or the display section 150 to control the separated projector 10 and display section 150. That is, the display control apparatus according to an embodiment of the present disclosure may correspond to an apparatus configured by combining the projector 10 and the display section 150, and control a display device that operates in a stand-alone manner. In addition, the display control apparatus according to an embodiment of the present disclosure may control a plurality of display devices.

Figure 11:
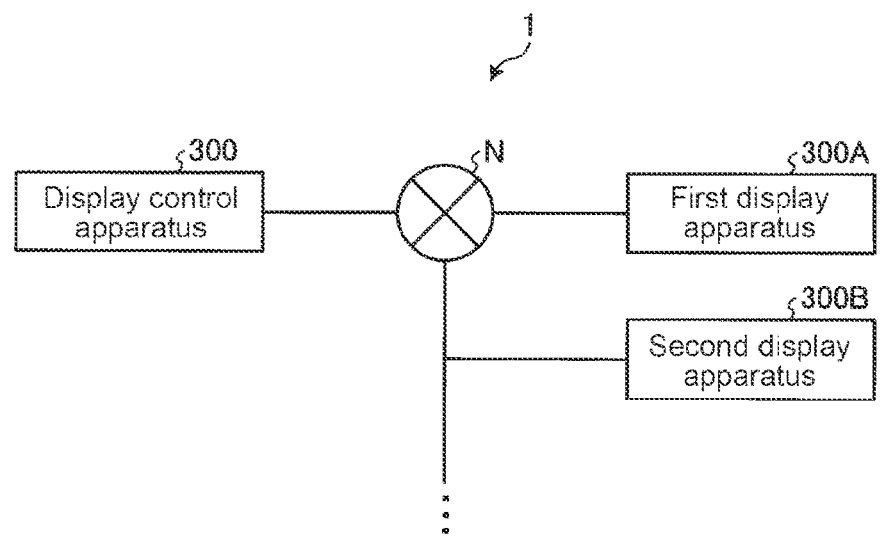
FIG. 11 is a diagram illustrating a configuration example of a display control system according to an embodiment of the present disclosure.

In this case, the display control processing according to an embodiment of the present disclosure may be executed by a display control system 1 illustrated in FIG. 11. FIG. 11 is a diagram illustrating a configuration example of the display control system 1 according to an embodiment of the present disclosure. As illustrated in FIG. 11, the display control system 1 includes a display control apparatus 300, and a first display apparatus 300A or a second display apparatus 300B. Note that the display control system 1 may include more display apparatuses.

In the display control system 1, the display control apparatus 300 collectively controls the transmittance of each display apparatus and an image signal on the basis of the illuminance sensor and the depth sensor provided in the vicinity of each of the first display apparatus 300A and the second display apparatus 300B.

In accordance with the display control system 1, since a plurality of display apparatuses can be controlled, for example, when the display apparatuses correspond to a plurality of digital signage, etc. simultaneously displaying the same content, it is possible to perform optimum display in accordance with each environment.

[3-2. Other]

For example, among the respective processes described in the respective embodiments, all or some of processes described as being automatically performed may be manually performed, or all or some of processes described as being manually performed may be automatically performed by a known method. In addition, a processing procedure, a specific name, and information including various data and parameters shown in the above-mentioned document and drawings can be arbitrarily changed unless otherwise specified. For example, various types of information shown in each figure are not limited to the illustrated information.

In addition, each component of each device illustrated in the figure is functionally conceptual, and does not necessarily need to be physically configured as illustrated in the figure. That is, a specific form of dispersion and integration of each device is not limited to the illustrated one, and all or some thereof may be functionally or physically dispersed/integrated in an arbitrary unit in accordance with various loads, usage conditions, etc.

In addition, the respective embodiments and modifications described above may be appropriately combined in a range not contradicting process content.

In addition, effects described in the present specification are merely examples and are not limited, and other effects may be present.

4. Effect of Display Control Apparatus According to Present Disclosure

As described above, the display control apparatus (the display control apparatus 100, etc. in an embodiment) according to an embodiment of the present disclosure includes the acquisition section (the acquisition section 132 in an embodiment) and the display controller (the display controller 133 in an embodiment). The acquisition section acquires information regarding the motion of the user visually recognizing the image projected on the display section including the transparent screen which reflects the image projected from the projector and the light control film having a variable transmittance. The display controller controls the pixel information of the image to be projected on the transparent screen and the transmittance of the light control film on the basis of the information regarding the motion of the user.

As described above, the display control apparatus according to an embodiment of the present disclosure adjusts the transmittance of the display section in accordance with the motion of the user, determines whether to project an image, selects a type of an image to be projected, and switches setting of the image signal. In this way, for example, the display control apparatus can exhibit a function as a mirror by projecting an image on the display section while maintaining visibility as a window. That is, the display control apparatus can ensure a wide field of view of the user while ensuring visibility of an image.

In addition, the acquisition section acquires the information regarding the sight line of the user as the information regarding the motion of the user. The display controller controls the pixel information of the image to be projected on the transparent screen and the transmittance of the light control film on the basis of the information regarding the sight line of the user. In this way, the display control apparatus can selectively display only information required by the user without displaying unnecessary information.

In addition, the acquisition section acquires information regarding a display section at which the user gazes among a plurality of display sections on the basis of the information regarding the sight line of the user. The display controller performs a control operation such that a display section at which the user gazes and a display section at which the user does not gaze have different pieces of pixel information and transmittances. In this way, the display control apparatus can display necessary information at a position at which the user gazes, and ensure a wide field of view of the user in other areas.

In addition, the display controller performs a control operation such that an image is projected on the display section at which the user gazes and the light control film is shielded from light, and performs a control operation such that an image is not projected on the display section at which the user does not gaze and the light control film is penetrated. In this way, the display control apparatus can provide a clear image to the user and ensure a wide field view of the user.

In addition, the acquisition section acquires the tracking information of the head of the user as the information regarding the motion of the user. The display controller controls the pixel information of the image to be projected on the transparent screen and the transmittance of the light control film on the basis of the tracking information of the head of the user. In this way, the display control apparatus can switch the image and the transmittance in accordance with the movement of the user without performing a troublesome operation for the user.

In addition, the acquisition section acquires a relative positional relationship between the user directly facing the display section and the display section. The display controller controls the pixel information of the image to be projected on the transparent screen and the transmittance of the light control film on the basis of the relative positional relationship between the user and the display section. In this way, the display control apparatus can perform appropriate image display in accordance with the user such as putting the display section in the transparent state when the user deviates from the display section, and displaying an image on the display section when the user directly faces the display section.

In addition, the acquisition section further acquires environment information around the display section. The display controller controls the pixel information of the image to be projected on the transparent screen and the transmittance of the light control film on the basis of the environment information. In this way, the display control apparatus can realize image display not causing the user to feel a sense of oppression while ensuring visibility of the image under external light.

In addition, the acquisition section acquires an illuminance around the display section. The display controller controls the pixel information of the image to be projected on the transparent screen and the transmittance of the light control film on the basis of the illuminance. In this way, the display control apparatus can perform appropriate display in accordance with the illuminance at a timing of displaying the image.

In addition, the display controller controls the pixel information of the image and the transmittance of the light control film on the basis of the setting information in which the illuminance, the pixel information of the image, and the transmittance of the light control film are associated in advance. In this way, the display control apparatus can control the display of the image on the basis of preset optimum setting, setting desired by the user, etc.

In addition, the display controller performs a control operation to lower the transmittance of the light control film and increase the luminance value of the pixel of the image as the illuminance is higher. In this way, the display control apparatus can perform appropriate display in accordance with the detected illuminance of the external light, etc.

In addition, the acquisition section acquires the environment information around the display section further including the light control mirror having a variable transmittance. The display controller controls at least one of the pixel information of the image to be projected on the transparent screen, the transmittance of the light control film, or the transmittance of the light control mirror on the basis of the environment information. In this way, the display control apparatus can provide the user with an image experience excellent in convenience in which an image of a physical mirror or an electronic mirror is selectively displayed.

In addition, the display controller controls at least one of the pixel information of the image, the transmittance of the light control film, or the transmittance of the light control mirror on the basis of the setting information in which the environment information is associated with at least one of the pixel information of the image, the transmittance of the light control film, or the transmittance of the light control mirror in advance. In this way, the display control apparatus can provide the user with a fresh image experience in which an overlapping image is displayed on a mirror put in a semi-transmissive state.

5. Hardware Configuration

Figure 12:
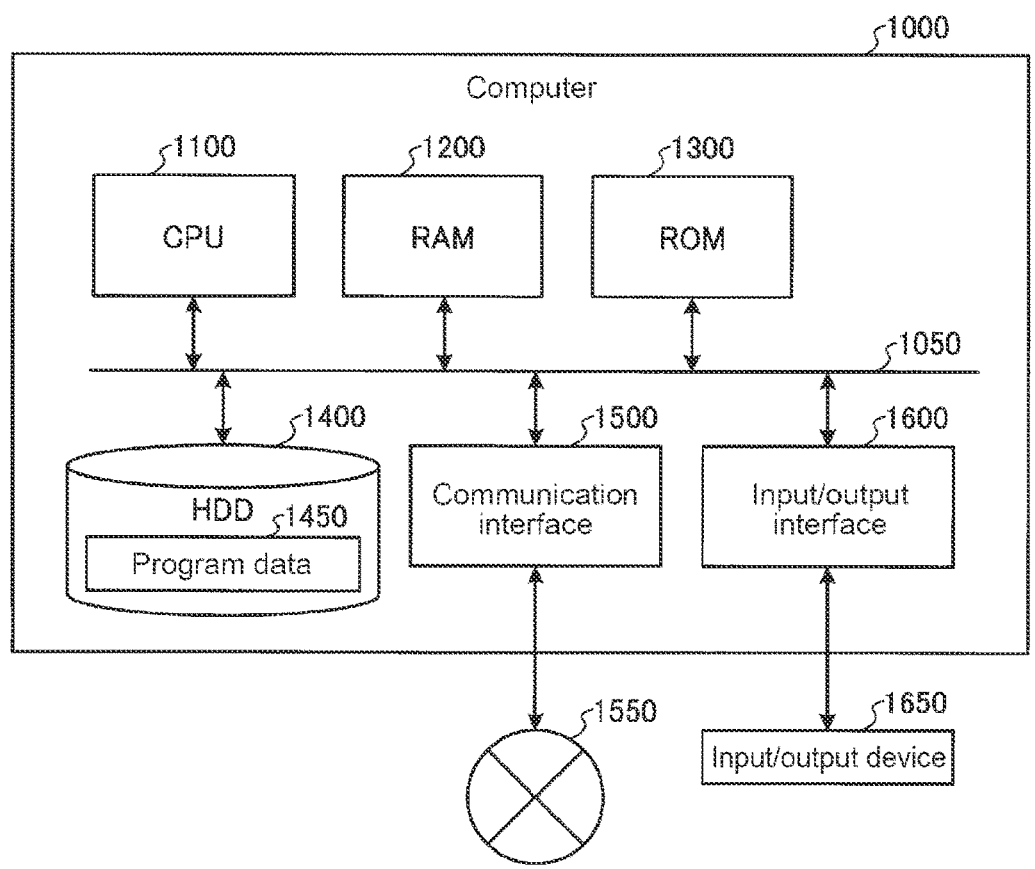
FIG. 12 is a hardware configuration diagram illustrating an example of a computer for realizing a function of the display control apparatus.

For example, information-processing equipment such as the display control apparatus 100 according to each embodiment described above is realized by a computer 1000 configured as illustrated in FIG. 12. Hereinafter, the display control apparatus 100 according to the first embodiment will be described as an example. FIG. 12 is a hardware configuration diagram illustrating an example of the computer 1000 for realizing a function of the display control apparatus 100. The computer 1000 includes a CPU 1100, a RAM 1200, a read only memory (ROM) 1300, a hard disk drive (HDD) 1400, a communication interface 1500, and an input/output interface 1600. Each section of the computer 1000 is connected by a bus 1050.

The CPU 1100 operates on the basis of a program stored in the ROM 1300 or the HDD 1400 to control each section. For example, the CPU 1100 loads a program stored in the ROM 1300 or the HDD 1400 into the RAM 1200 and executes processing corresponding to various programs.

The ROM 1300 stores a boot program such as a basic input output system (BIOS) executed by the CPU 1100 when the computer 1000 starts up, and a program that depends on hardware of the computer 1000.

The HDD 1400 is a computer readable recording medium for non-temporarily recording a program executed by the CPU 1100, data used by the program, etc. Specifically, the HDD 1400 is a recording medium for recording a display control program according to an embodiment of the present disclosure, which is an example of the program data 1450.

The communication interface 1500 is an interface for connecting the computer 1000 to an external network 1550 (for example, the Internet). For example, the CPU 1100 receives data from another device via the communication interface 1500, and transmits data generated by the CPU 1100 to another device.

The input/output interface 1600 is an interface for connecting the input/output device 1650 and the computer 1000 to each other. For example, the CPU 1100 receives data from an input device such as a keyboard and a mouse via the input/output interface 1600. In addition, the CPU 1100 transmits data to an output device such as a display and a speaker via the input/output interface 1600. In addition, the input/output interface 1600 may function as a media interface for reading a program, etc. recorded on a predetermined recording medium (media). Examples of the media include an optical recording medium such as a digital versatile disc (DVD) and a phase change rewritable disk (PD), a magneto-optical recording medium such as a magneto-optical disk (MO), a tape medium, a magnetic recording medium, and a semiconductor memory.

For example, when the computer 1000 functions as the display control apparatus 100 according to an embodiment of the present disclosure, the CPU 1100 of the computer 1000 implements a function of the control section 130, etc. by executing the display control program loaded on the RAM 1200. In addition, the HDD 1400 stores the display control program according to an embodiment of the present disclosure and data in the storage section 120. Note that even though the CPU 1100 reads the program data 1450 from the HDD 1400 and executes the program data 1450, these programs may be acquired from another device via the external network 1550 as another example.

Note that the present technology can be configured as follows.

(1) A display control apparatus including
an acquisition section that acquires information regarding motion of a user visually recognizing an image projected on a display section, the display section including a transparent screen and a light control film, the transparent screen reflecting an image projected from a projector, the light control film having a variable transmittance; and
a display controller that controls, on a basis of the information regarding the motion of the user, pixel information of an image to be projected on the transparent screen and a transmittance of the light control film.

(2) The display control apparatus according to (1), in which
the acquisition section acquires information regarding a sight line of the user as the information regarding the motion of the user, and
the display controller controls, on a basis of the information regarding the sight line of the user, the pixel information of the image to be projected on the transparent screen and the transmittance of the light control film.

(3) The display control apparatus according to (1) or (2), in which
the acquisition section acquires, on a basis of information regarding a sight line of the user, information regarding a display section at which the user gazes among a plurality of display sections, and
the display controller performs a control operation such that the display section at which the user gazes and a display section at which the user does not gaze have different pieces of pixel information and transmittances.

(4) The display control apparatus according to any one of (1) to (3), in which
the display controller performs a control operation such that an image is projected on the display section at which the user gazes and the light control film is shielded from light, and performs a control operation such that an image is not projected on the display section at which the user does not gaze and the light control film is penetrated.

(5) The display control apparatus according to any one of (1) to (4), in which
the acquisition section acquires tracking information of a head of the user as the information regarding the motion of the user, and
the display controller controls, on a basis of the tracking information of the head of the user, the pixel information of the image to be projected on the transparent screen and the transmittance of the light control film.

(6) The display control apparatus according to any one of (1) to (5), in which
the acquisition section acquires a relative positional relationship between a user directly facing the display section and the display section, and
the display controller controls, on a basis of the relative positional relationship between the user and the display section, the pixel information of the image to be projected on the transparent screen and the transmittance of the light control film.

(7) The display control apparatus according to any one of (1) to (6), in which
the acquisition section further acquires environment information around the display section, and
the display controller controls, on a basis of the environment information, the pixel information of the image to be projected on the transparent screen and the transmittance of the light control film.

(8) The display control apparatus according to any one of (1) to (7), in which
the acquisition section acquires an illuminance around the display section, and
the display controller controls, on a basis of the illuminance, the pixel information of the image to be projected on the transparent screen and the transmittance of the light control film.

(9) The display control apparatus according to any one of (1) to (8), in which
the display controller controls the pixel information of the image and the transmittance of the light control film on a basis of setting information in which the illuminance, the pixel information of the image, and the transmittance of the light control film are associated in advance.

(10) The display control apparatus according to any one of (1) to (9), in which
the display controller performs a control operation to lower the transmittance of the light control film and increase a luminance value of the pixel of the image as the illuminance is higher.

(11) The display control apparatus according to any one of (1) to (10), in which
the acquisition section acquires environment information around a display section further including a light control mirror having a variable transmittance, and
the display controller controls at least one of the pixel information of the image to be projected on the transparent screen, the transmittance of the light control film, or the transmittance of the light control mirror on a basis of the environment information.

(12) The display control apparatus according to any one of (1) to (11), in which
the display controller controls at least one of the pixel information of the image, the transmittance of the light control film, or the transmittance of the light control mirror on a basis of setting information in which the environment information is associated with at least one of the pixel information of the image, the transmittance of the light control film, or the transmittance of the light control mirror in advance.

(13) A display control method, including: by a computer,
acquiring information regarding motion of a user visually recognizing an image projected on a display section, the display section including a transparent screen and a light control film, the transparent screen reflecting an image projected from a projector, the light control film having a variable transmittance; and
controlling, on a basis of the information regarding the motion of the user, pixel information of an image to be projected on the transparent screen and a transmittance of the light control film.

(14) A display control program causing a computer to function as
an acquisition section that acquires information regarding motion of a user visually recognizing an image projected on a display section, the display section including a transparent screen and a light control film, the transparent screen reflecting an image projected from a projector, the light control film having a variable transmittance; and
a display controller that controls, on a basis of the information regarding the motion of the user, pixel information of an image to be projected on the transparent screen and a transmittance of the light control film.

(15) An apparatus including:
circuitry configured to:
control a transmissivity of a transparent screen and a brightness of an image projected on the transparent screen, based on a motion of a user.

(16) The apparatus according to (15), wherein the circuitry is further configured to:
acquire, from at least one sensor, motion information associated with the motion of the user.

(17) The apparatus according to (15) or (16), wherein the motion of the user includes a gaze of the user.

(18) The apparatus according to any one of (15) to (17), wherein the circuitry is further configured to:
control the brightness of the projected image to be a first level based on the gaze of the user being at a position corresponding to the transparent screen; and control the brightness of the projected image to be a second level based on the gaze of the user being at a position not corresponding to the transparent screen, wherein the first level is higher than the second level.

(19) The apparatus according to any one of (15) to (18), wherein the circuitry is further configured to:
control the transmissivity of the transparent screen to be a first level based on the gaze of the user being at a position corresponding to the transparent screen; and
control the transmissivity of the transparent screen to be a second level based on the gaze of the user being at a position not corresponding to the transparent screen, wherein the first level is lower than the second level.

(20) The apparatus according to any one of (15) to (19), wherein the motion of the user includes a head movement of the user.

(21) The apparatus according to any one of (15) to (20), wherein the circuitry is further configured to:
determine whether the head movement of the user is moving sideways with respect to the transparent screen or upward/downward with respect to the transparent screen; and
control the transmissivity of the transparent screen or the brightness of the projected image based on the determination.

(22) The apparatus according to any one of (15) to (21), wherein the circuitry is further configured to:
control the brightness of the projected image to be a first level based on a determination that the head movement of the user is moving upward/downward; and
control the brightness of the projected image to be a second level lower than the first level, based on a determination that the head movement of the user is moving sideways.

(23) The apparatus according to any one of (15) to (22), wherein the circuitry is further configured to:
control the transmissivity of the transparent screen to be a first level based on a determination that the head movement of the user is moving upward/downward; and
control the transmissivity of the transparent screen to be a second level higher than the first level based on a determination that the head movement of the user is moving sideways.

(24) The apparatus according to any one of (15) to (23), wherein the motion of the user includes a relative position relationship between the user and the transparent screen, and wherein the circuitry is further configured to:
determine whether the relative position relationship between the user and the transparent screen is within a predetermined angle; and
control the transmissivity of the transparent screen or the brightness of the projected image based on the determination.

(25) The apparatus according to any one of (15) to (24), wherein the circuitry is further configured to:
acquire environment information associated with an environment proximate to the transparent screen; and
control the transmissivity of the transparent screen and the brightness of the image based on the acquired environment information.

(26) The apparatus according to any one of (15) to (25), wherein the circuitry is further configured to:
control a transmissivity of a light control mirror based on the motion of the user.

(27) The apparatus according to any one of (15) to (26), wherein the light control mirror is configured to switch between a mirror state and a transparent state.

(28) The apparatus according to any one of (15) to (27), wherein the circuitry is further configured to:
determine whether the user is directly facing the transparent screen or obliquely facing the transparent screen based on the acquired motion information;
control the light control mirror to be in the mirror state based on a determination that the user is directly facing the transparent screen; and
control the light control mirror to be in a transparent state based on a determination that the user is obliquely facing the transparent screen.

(29) The apparatus according to any one of (15) to (28), wherein the circuitry is further configured to:
determine whether the user is directly facing the transparent screen or obliquely facing the transparent screen based on the acquired motion information; and
control the transmissivity of the transparent screen, a transmissivity of a light control mirror, or the brightness of the projected image, based on the determination.

(30) The apparatus according to any one of (15) to (29), wherein the circuitry is further configured to:
control the brightness of the projected image to be a first level based on a determination that the user is directly facing the transparent screen; and
control the brightness of the projected image to be a second level higher than the first level based on a determination that the user is obliquely facing the transparent screen.

(31) The apparatus according to any one of (15) to (30), wherein the circuitry is further configured to:
control the transmissivity of the transparent screen to be a first level based on a determination that the user is directly facing the transparent screen; and
control the transmissivity of the transparent screen to be a second level higher than the first level based on a determination that the user is obliquely facing the transparent screen.

(32) The apparatus according to any one of (15) to (31), wherein the circuitry is further configured to:
control the transmissivity of the light control mirror to be a first level based on a determination that the user is directly facing the transparent screen; and
control the transmissivity of the light control mirror to be a second level higher than the first level based on a determination that the user is obliquely facing the transparent screen.

(33) A method including:
controlling a transmissivity of a transparent screen and a brightness of an image projected on the transparent screen, based on a motion of a user.

(34) A non-transitory computer-readable medium having embodied thereon a program, which when executed by a computer causes the computer to execute a method, the method including:
controlling a transmissivity of a transparent screen and a brightness of an image projected on the transparent screen, based on a motion of a user.

REFERENCE SIGNS LIST

10 Projector
20 Light control film
30 Transparent screen

40 Light control mirror
60 Speaker
100, 200, 300 Display control apparatus
110 Communication section
120, 220 Storage section
130 Control section
131 Detector
132 Acquisition section
133 Display controller
134 Light control section
140 Sensor
150, 250 Display section
160 Output section

The invention claimed is:

1. An apparatus for controlling display properties associated with a vehicle, the apparatus comprising:
circuitry configured to:
control a transmittance of a light control film and a projection of an image on a transparent screen, based on a motion of a user, wherein the motion of the user includes a gaze of the user relative to the transparent screen;
control the transmittance of the light control film to be a first level, and the projection of the image so that the image is projected on the transparent screen based on the gaze of the user being at a position corresponding to the transparent screen; and
control the transmittance of the light control film to be a second level and the projection of the image so that the image is not projected on the transparent screen based on the gaze of the user being at a position not corresponding to the transparent screen,
wherein the first level is lower than the second level,
wherein the light control film is in a black screen state when the light control film is controlled to be in the first level and the light control film is in a transparent state when the light control film is controlled to be in the second level,
wherein a first display and a second display each includes the light control film and the transparent screen,
wherein the first display and the second display are both displays associated with the vehicle, and
wherein the circuitry is further configured to:
switch between projecting the image and another image in the first display and the second display based on whether the user is located in a driver seat of the vehicle or a passenger seat of the vehicle, the driver seat being different than the passenger seat;
switch to controlling the transmittance of the light control film and the projection of the image in the first display and the second display at a same time so that the transmittance of the light control film is the first level in the first display and the image is projected on the transparent screen in the first display and the transmittance of the light control film is the second level in the second display and the image is not projected on the transparent screen in the second display based on the gaze of the user being at the position corresponding to the first display and the user being located in the driver seat of the vehicle;
switch to controlling the transmittance of the light control film and the projection of the image in the first display and the second display at a same time so that the transmittance of the light control film is the second level in the first display and the image is not projected on the transparent screen in the first display and the transmittance of the light control film is the first level in the second display and the image is projected on the transparent screen in the second display based on the gaze of the user being at the position corresponding to the second display and the user being located in the driver seat; and
switch to controlling the projection of the another image in the first display and the second display at the same time based on the user being located in the passenger seat of the vehicle and the gaze of the user being at the position corresponding to the first display or the gaze of the user being at the position corresponding to the second display, the another image being different than the image.

2. The apparatus of claim 1, wherein the circuitry is further configured to:
acquire, from at least one sensor, motion information associated with the motion of the user.

3. The apparatus of claim 2, wherein the circuitry is further configured to:
determine whether the user is directly facing the transparent screen or obliquely facing the transparent screen based on the acquired motion information;
control a light control mirror to be in a mirror state based on a determination that the user is directly facing the transparent screen; and
control the light control mirror to be in a transparent state based on a determination that the user is obliquely facing the transparent screen.

4. The apparatus of claim 2, wherein the circuitry is further configured to:
determine whether the user is directly facing the transparent screen or obliquely facing the transparent screen based on the acquired motion information; and
control a transmissivity of a light control mirror or a brightness of the projected image, based on the determination.

5. The apparatus of claim 4, wherein the circuitry is further configured to:
control the brightness of the projected image to be a third level based on a determination that the user is directly facing the transparent screen; and
control the brightness of the projected image to be a fourth level higher than the third level based on a determination that the user is obliquely facing the transparent screen.

6. The apparatus of claim 4, wherein the controlling of the transmissivity of the light control mirror and the brightness of the projected image are performed at a same time.

7. The apparatus of claim 4, wherein the circuitry is further configured to:
control the transmissivity of a light control mirror to be a third level based on a determination that the user is directly facing the transparent screen; and
control the transmissivity of the light control mirror to be a fourth level higher than the third level based on a determination that the user is obliquely facing the transparent screen.

8. The apparatus of claim 1,
wherein the circuitry is further configured to:
control a brightness of the projected image to be a third level based on the gaze of the user being at a position corresponding to the transparent screen; and
control the brightness of the projected image to be a fourth level based on the gaze of the user being at a position not corresponding to the transparent screen, and
wherein the third level is higher than the fourth level.

9. The apparatus of claim 1, wherein the motion of the user includes a head movement of the user, and
wherein the circuitry is further configured to:
determine whether a direction of the head movement of the user is moving sideways with respect to the transparent screen or upward/downward with respect to the transparent screen; and
control transmittance of the light control film or the projection of the image based on the determination.

10. The apparatus of claim 9, wherein the circuitry is further configured to:
control the projection of the projected image so that the image is projected on the transparent screen based on a determination that the direction of the head movement of the user is moving upward/downward with respect to the transparent screen; and
control the projection of the projected image so that the image is not projected on the transparent screen, based on a determination that the direction of the head movement of the user is moving sideways with respect to the transparent screen.

11. The apparatus of claim 9, wherein the circuitry is further configured to:
control the transmittance of the light control film to be the first level based on a determination that the direction of the head movement of the user is moving upward/downward with respect to the transparent screen; and
control the transmittance of the light control film to be the second level based on a determination that the direction of the head movement of the user is moving sideways with respect to the transparent screen.

12. The apparatus of claim 1, wherein the motion of the user includes a relative position relationship between the user and the transparent screen, and
wherein the circuitry is further configured to:
determine whether the relative position relationship between the user and the transparent screen is within a predetermined angle; and
control the transmittance of the light control film or the projection of the image based on the determination.

13. The apparatus of claim 1, wherein the circuitry is further configured to:
acquire environment information associated with an environment proximate to the transparent screen; and
control the transmittance of the light control film and the projection of the image based on the acquired environment information.

14. The apparatus of claim 1,
wherein the circuitry is further configured to:
control a transmissivity of a light control mirror to switch the light control mirror to a mirror state based on a direction of a head movement of the user being a first direction with respect to the transparent screen; and
control the transmissivity of the light control mirror to switch the light control mirror to a transparent state based on the direction of the head movement of the user being a second direction with respect to the transparent screen.

15. A method for controlling display properties associated with a vehicle, the method comprising:
controlling a transmittance of a light control film and a projection of an image on a transparent screen, based on a motion of a user, wherein the motion of the user includes a gaze of the user relative to the transparent screen;
controlling the transmittance of the light control film to be a first level and the projection of the image so that the image is projected on the transparent screen based on the gaze of the user being at a position corresponding to the transparent screen; and
controlling the transmittance of the light control film to be a second level and the projection of the image so that the image is not projected on the transparent screen based on the gaze of the user being at a position not corresponding to the transparent screen,
wherein the first level is lower than the second level,
wherein the light control film is in a black screen state when the light control film is controlled to be in the first level and the light control film is in a transparent state when the light control film is controlled to be in the second level,
wherein a first display and a second display each includes the light control film and the transparent screen,
wherein the first display and the second display are both displays associated with the vehicle, and
wherein the controlling of the transmittance of the light control film and the projection of the image includes:
switching between displaying the image and another image in the first display and the second display based on whether the user is located in a driver seat of the vehicle or a passenger seat of the vehicle, the driver seat being different than the passenger seat;
switching to control the transmittance of the light control film and the projection of the image in the first display and the second display at a same time so that the transmittance of the light control film is the first level in the first display and the image is projected on the transparent screen in the first display and the transmittance of the light control film is the second level in the second display and the image is not projected on the transparent screen in the second display based on the gaze of the user being at the position corresponding to the first display and the user being located in the driver seat of the vehicle;
switching to control the transmittance of the light control film and the projection of the image in the first display and the second display at a same time so that the transmittance of the light control film is the second level in the first display and the image is not projected on the transparent screen in the first display and the transmittance of the light control film is the first level in the second display and the image is projected on the transparent screen in the second display based on the gaze of the user being at the position corresponding to the second display and the user being located in the driver seat; and
switching to control the projection of the another image in the first display and the second display at the same time based on the user being located in the passenger seat of the vehicle and the gaze of the user being at the position corresponding to the first display or the gaze of the user being at the position corresponding to the second display, the another image being different than the image.

16. A non-transitory computer-readable medium having embodied thereon a program, which when executed by a computer causes the computer to execute a method for controlling display properties associated with a vehicle, the method comprising:
controlling a transmittance of a light control film and a projection of an image on a transparent screen, based on a motion of a user, wherein the motion of the user includes a gaze of the user relative to the transparent screen;

controlling the transmittance of the light control film to be a first level and the projection of the image so that the image is projected on the transparent screen based on the gaze of the user being at a position corresponding to the transparent screen; and controlling the transmittance of the light control film to be a second level and the projection of the image so that the image is not projected on the transparent screen based on the gaze of the user being at a position not corresponding to the transparent screen, wherein the first level is lower than the second level, wherein the light control film is in a black screen state when the light control film is controlled to be in the first level and the light control film is in a transparent state when the light control film is controlled to be in the second level, wherein a first display and a second display each includes the light control film and the transparent screen, wherein the first display and the second display are both displays associated with the vehicle, and wherein the controlling of the transmittance of the light control film and the projection of the image includes:

switch between displaying the image and another image in the first display and the second display based on whether the user is located in a driver seat of the vehicle or a passenger seat of the vehicle, the driver seat being different than the passenger seat;

switching to control the transmittance of the light control film and the projection of the image in the first display and the second display at a same time so that the transmittance of the light control film is the first level in the first display and the image is projected on the transparent screen in the first display and the transmittance of the light control film is the second level in the second display and the image is not projected on the transparent screen in the second display based on the gaze of the user being at the position corresponding to the first display and the user being located in the driver seat of the vehicle;

switching to control the transmittance of the light control film and the projection of the image in the first display and the second display at a same time so that the transmittance of the light control film is the second level in the first display and the image is not projected on the transparent screen in the first display and the transmittance of the light control film is the first level in the second display and the image is projected on the transparent screen in the second display based on the gaze of the user being at the position corresponding to the second display and the user being located in the driver seat; and switching to control the projection of the another image in the first display and the second display at the same time based on the user being located in the passenger seat of the vehicle and the gaze of the user being at the position corresponding to the first display or the gaze of the user being at the position corresponding to the second display, the another image being different than the image.

17. A display control system for controlling display properties associated with a vehicle, the display control system comprising:

a transparent screen;

a projector; and circuitry configured to:

control a transmittance of a light control film and a projection of an image from the projector on a transparent screen, based on a motion of a user, wherein the motion of the user includes a gaze of the user relative to the transparent screen;

control the transmittance of the light control film to be a first level and the projection of the image so that the image is projected on the transparent screen based on the gaze of the user being at a position corresponding to the transparent screen; and control the transmittance of the light control film to be a second level and the projection of the image so that the image is not projected on the transparent screen based on the gaze of the user being at a position not corresponding to the transparent screen, wherein the first level is lower than the second level, wherein the light control film is in a black screen state when the light control film is controlled to be in the first level and the light control film is in a transparent state when the light control film is controlled to be in the second level, wherein a first display and a second display each includes the light control film and the transparent screen, wherein the first display and the second display are both displays associated with the vehicle, and wherein the circuitry is further configured to:

switch between displaying the image and another image in the first display and the second display based on whether the user is located in a driver seat of the vehicle or a passenger seat of the vehicle, the driver seat being different than the passenger seat;

switch to controlling the transmittance of the light control film and the projection of the image in the first display and the second display at a same time so that the transmittance of the light control film is the first level in the first display and the image is projected on the transparent screen in the first display and the transmittance of the light control film is the second level in the second display and the image is not projected on the transparent screen in the second display based on the gaze of the user being at the position corresponding to the first display and the user being located in a driver seat of the vehicle;

switch to controlling the transmittance of the light control film and the projection of the image in the first display and the second display at a same time so that the transmittance of the light control film is the second level in the first display and the image is not projected on the transparent screen in the first display and the transmittance of the light control film is the first level in the second display and the image is projected on the transparent screen in the second display based on the gaze of the user being at the position corresponding to the second display and the user being located in the driver seat; and switch to controlling the projection of the another image in the first display and the second display at the same time based on the user being located in the passenger seat of the vehicle and the gaze of the user being at the position corresponding to the first display or the gaze of the user being at the position corresponding to the second display, the another image being different than the image.

* * * * *